United States Patent
Walker, Jr. et al.

(10) Patent No.: US 10,245,812 B2
(45) Date of Patent: Apr. 2, 2019

(54) DUAL CURE STAIN RESISTANT MICROSPHERE ARTICLES

(71) Applicant: 3M INNOVATIVE PROPERTIES COMPANY, St. Paul, MN (US)

(72) Inventors: Christopher B. Walker, Jr., St. Paul, MN (US); John C. Clark, Maplewood, MN (US); Thomas P. Klun, Lakeland, MN (US); Steven J. McMan, Stillwater, MN (US); Abdullahi A. Mohamud, Minnetonka, MN (US); Alexander J. Kugel, Woodbury, MN (US); Vivek Krishnan, St. Paul, MN (US)

(73) Assignee: 3M Innovative Properties Company, St. Paul ( * ) Notice: Subject to any disclaimer, the term of this patent is extended or adjusted under 35 U.S.C. 154(b) by 263 days.

(21) Appl. No.: 15/117,478

(22) PCT Filed: Feb. 13, 2015

(86) PCT No.: PCT/US2015/015923
§ 371 (c)(1),
(2) Date: Aug. 9, 2016

(87) PCT Pub. No.: WO2015/123582
PCT Pub. Date: Aug. 20, 2015

(65) Prior Publication Data
US 2016/0347042 A1    Dec. 1, 2016

Related U.S. Application Data

(60) Provisional application No. 61/939,369, filed on Feb. 13, 2014, provisional application No. 61/944,782, filed on Feb. 26, 2014.

(51) Int. Cl.
*B32B 27/14* (2006.01)
*B32B 27/30* (2006.01)
(Continued)

(52) U.S. Cl.
CPC ............ *B32B 27/322* (2013.01); *B32B 3/00* (2013.01); *B32B 3/02* (2013.01); *B32B 3/16* (2013.01);
(Continued)

(58) Field of Classification Search
CPC ............ C08F 214/186; C08F 214/225; C08F 214/245; C08F 214/265; C08F 214/285
See application file for complete search history.

(56) References Cited

U.S. PATENT DOCUMENTS

| 2,326,634 A | 8/1943 | Gebhard |
| 2,567,233 A | 9/1951 | Palmquist |

(Continued)

FOREIGN PATENT DOCUMENTS

| CN | 101319113 | 6/2010 |
| CN | 101314684 | 9/2010 |

(Continued)

OTHER PUBLICATIONS

International Search Report for PCT International Application No. PCT/US2015/015923, dated Apr. 23, 2015, 4 pages.

*Primary Examiner* — Ramsey Zacharia
(74) *Attorney, Agent, or Firm* — Qiang Han

(57) ABSTRACT

There is provided a thermoformable article comprising at least a first surface having a binder resin layer comprising a fluorine-containing polymer, where the binder resin layer has a first major surface opposite a second major surface; and a plurality of microspheres partially and adhered to the first major surface of the binder resin layer; where the fluorine-containing polymer is a partially fluorinated poly- (Continued)

mer derived from at least one fluorine containing monomer and two or more non-fluorinated monomers having at least one active hydrogen functional group, and further wherein at least one but not all of the active hydrogen functional groups are reacted with at least one curing agent having latent functionality. In some instances the curing agent comprises polyisocyanate. There is also provided a thermoset article derived from such thermoformable articles.

24 Claims, 1 Drawing Sheet

(51) Int. Cl.
| | |
|---|---|
| B32B 27/32 | (2006.01) |
| B32B 3/14 | (2006.01) |
| B32B 7/00 | (2019.01) |
| B32B 7/02 | (2019.01) |
| B32B 7/12 | (2006.01) |
| B32B 9/00 | (2006.01) |
| B32B 27/00 | (2006.01) |
| B32B 27/06 | (2006.01) |
| B32B 27/08 | (2006.01) |
| B32B 27/18 | (2006.01) |
| B32B 27/20 | (2006.01) |
| B32B 27/36 | (2006.01) |
| B32B 27/38 | (2006.01) |
| B32B 3/00 | (2006.01) |
| B32B 3/02 | (2006.01) |
| B32B 3/16 | (2006.01) |
| B32B 3/30 | (2006.01) |

(52) U.S. Cl.
CPC .......... B32B 3/30 (2013.01); B32B 7/00 (2013.01); B32B 7/02 (2013.01); B32B 7/12 (2013.01); B32B 9/00 (2013.01); B32B 27/00 (2013.01); B32B 27/06 (2013.01); B32B 27/08 (2013.01); B32B 27/14 (2013.01); B32B 27/18 (2013.01); B32B 27/20 (2013.01); B32B 27/30 (2013.01); B32B 27/304 (2013.01); B32B 27/308 (2013.01); B32B 27/36 (2013.01); B32B 27/38 (2013.01); B32B 3/14 (2013.01); B32B 2260/00 (2013.01); B32B 2260/025 (2013.01); B32B 2264/00 (2013.01); B32B 2307/308 (2013.01); B32B 2307/50 (2013.01); B32B 2307/54 (2013.01); B32B 2451/00 (2013.01)

(56) References Cited

U.S. PATENT DOCUMENTS

| | | |
|---|---|---|
| 2,803,656 A | 8/1957 | Ahlbrecht |
| 3,154,872 A | 11/1964 | Nordgren |
| 3,172,942 A | 3/1965 | Berg |
| 3,190,178 A | 6/1965 | McKenzie |
| 3,551,025 A | 12/1970 | Bingham |
| 3,700,305 A | 10/1972 | Bingham |
| 3,700,478 A | 10/1972 | Bingham |
| 3,758,192 A | 9/1973 | Bingham |
| 3,764,455 A | 10/1973 | Lovell |
| 3,801,183 A | 4/1974 | Sevelin |
| 4,025,159 A | 5/1977 | McGrath |
| 4,102,562 A | 7/1978 | Harper |
| 4,107,391 A | 8/1978 | Moore |
| 4,198,465 A | 4/1980 | Moore |
| 4,393,187 A | 7/1983 | Boba |
| 4,576,850 A | 3/1986 | Martens |
| 4,653,854 A | 3/1987 | Miyata |
| 4,721,649 A | 1/1988 | Belisle |
| 4,725,494 A | 2/1988 | Belisle |
| 4,763,985 A | 8/1988 | Bingham |
| 4,808,471 A | 2/1989 | Grunzinger |
| 4,849,265 A | 7/1989 | Ueda |
| 4,897,136 A | 1/1990 | Bailey |
| 5,008,142 A | 4/1991 | Wilson |
| 5,064,272 A | 11/1991 | Bailey |
| 5,117,304 A | 5/1992 | Huang |
| 5,174,848 A | 12/1992 | Yazaki |
| 5,200,262 A | 4/1993 | Li |
| 5,283,101 A | 2/1994 | Li |
| 5,344,705 A | 9/1994 | Olsen |
| 5,474,827 A | 12/1995 | Crandall |
| 5,620,775 A | 4/1997 | LaPerre |
| 5,645,938 A | 7/1997 | Crandall |
| 5,784,198 A | 7/1998 | Nagaoka |
| 5,812,317 A | 9/1998 | Billingsley |
| 5,882,771 A | 3/1999 | Klein |
| 5,912,081 A | 6/1999 | Negele |
| 5,928,778 A | 7/1999 | Takahashi |
| 5,959,775 A | 9/1999 | Joseph |
| 5,976,669 A | 11/1999 | Fleming |
| 5,993,588 A | 11/1999 | Nakamura |
| 6,040,044 A | 3/2000 | Takahashi |
| 6,054,208 A | 4/2000 | Rega |
| 6,060,157 A | 5/2000 | LaPerre |
| 6,066,384 A | 5/2000 | Crandall |
| 6,156,436 A | 12/2000 | Joseph |
| 6,221,439 B1 | 4/2001 | Negele |
| 6,342,119 B1 | 1/2002 | Shih |
| 6,355,302 B1 | 3/2002 | Vandenberg |
| 6,416,188 B1 | 7/2002 | Shusta |
| 6,416,856 B1 | 7/2002 | Crandall |
| 6,527,898 B1 | 3/2003 | Nakamura |
| 6,596,390 B1 | 7/2003 | Negele |
| 6,632,508 B1 | 10/2003 | Pellerite |
| 6,677,028 B1 | 1/2004 | Lasch |
| 6,777,089 B1 | 8/2004 | Koniger |
| 6,815,040 B2 | 11/2004 | Pellerite |
| 6,815,501 B2 | 11/2004 | Flosbach |
| 6,835,420 B1 | 12/2004 | Rockrath |
| 6,852,399 B2 | 2/2005 | Takahashi |
| 6,905,754 B2 | 6/2005 | Jing |
| 7,241,494 B2 | 7/2007 | Koeniger |
| 7,695,147 B2 | 4/2010 | Lee |
| 7,812,075 B2 | 10/2010 | Hong |
| 7,915,321 B2 | 3/2011 | Baumgart |
| 7,985,478 B2 | 7/2011 | Baumgart |
| 8,030,430 B2 | 10/2011 | Fan |
| 8,420,217 B2 | 4/2013 | Johnson |
| 8,460,497 B2 | 6/2013 | Weinert |
| 8,470,394 B2 | 6/2013 | Koppes |
| 8,634,146 B2 | 1/2014 | David |
| 2004/0023019 A1 | 2/2004 | Vandenberg |
| 2005/0197444 A1 | 9/2005 | Kyte |
| 2005/0280173 A1 | 12/2005 | Wirtz |
| 2006/0009381 A1 | 1/2006 | Reutelingsperger |
| 2006/0051559 A1 | 3/2006 | Sleeman |
| 2006/0237124 A1 | 10/2006 | Bartoli |
| 2008/0135171 A1 | 6/2008 | Gruber |
| 2009/0001626 A1 | 1/2009 | Wirtz |
| 2009/0269504 A1 | 10/2009 | Liao |
| 2010/0003523 A1 | 1/2010 | Sharygin |
| 2010/0021737 A1 | 1/2010 | Beck |
| 2010/0092759 A1 | 4/2010 | Fan et al. |
| 2010/0180938 A1 | 7/2010 | Nagato et al. |
| 2011/0045176 A1 | 2/2011 | Koppes |
| 2011/0183120 A1 | 7/2011 | Sharygin |
| 2012/0129120 A1 | 5/2012 | Foerster |
| 2013/0052437 A1 | 2/2013 | Barth |

FOREIGN PATENT DOCUMENTS

| | | |
|---|---|---|
| CN | 102224189 | 10/2011 |
| EP | 0386297 | 9/1990 |
| EP | 1271191 | 1/2003 |
| EP | 1273934 | 1/2003 |
| GB | 1303103 | 1/1973 |
| GB | 1447585 | 8/1976 |

(56) References Cited

FOREIGN PATENT DOCUMENTS

| | | |
|---|---|---|
| JP | H03-224950 | 10/1991 |
| JP | H07-024958 | 1/1995 |
| JP | 2009-024145 | 2/2009 |
| JP | 2010-182862 | 8/2010 |
| WO | WO 2003-011579 | 2/2003 |
| WO | WO 2008-007394 | 1/2008 |
| WO | WO 2008-077903 | 7/2008 |
| WO | WO 2011-019415 | 2/2011 |
| WO | WO 2012/082576 | 6/2012 |
| WO | WO 2013/126361 | 8/2013 |
| WO | WO 2014-055828 | 4/2014 |
| WO | WO 2014-210249 | 12/2014 |

DUAL CURE STAIN RESISTANT MICROSPHERE ARTICLES

CROSS REFERENCE TO RELATED APPLICATIONS

This application is a national stage filing under 35 U.S.C. 371 of PCT/US2015/015923, filed Feb. 13, 2015, which claims the benefit of U.S. Provisional Application No. 61/939,369, filed Feb. 13, 2014, and U.S. Provisional Application No. 61/944,782, filed Feb. 26, 2014, the disclosure of which are incorporated by reference in their entirety herein.

FIELD

This disclosure relates to dual cure stain resistant articles that are coated with microspheres.

BACKGROUND

Decorative protective surfaces find many consumer applications. Household appliances, automotive interiors and paints, consumer electronic devices, such as laptops and hand held devices, are all examples where consumers prefer materials that deliver considerable protection from stains, scratches, wear and abrasion while retaining cosmetic and aesthetic appeal through the material's lifecycle.

Durable decorative laminates and films comprised of glass beads are broadly known. These low gloss constructions typically consist of exposed glass bead surfaces that impart high durability and decorative properties to the construction. For example, U.S. Pat. No. 4,849,265 (Ueda) discloses decorative abrasion resistant laminates that contain hard microspheres (glass or plastic) that are either exposed or surface coated with a thin polymer coating. Low friction properties of such constructions have also been disclosed. An example is U.S. Pat. No. 5,620,775 (LaPerre), which discloses durable, low coefficient of friction polymeric films made by having an exposed glass bead surface with glass. Specifically, bead films and low coefficient of friction decorative bead films are known in the art, but bead films which are stain resistant to highly staining materials such as yellow mustard, blood, wine, etc., even at elevated temperature and humidity, that also exhibit low coefficient of friction, good abrasion resistance, and sufficient hardness have not been described previously.

There is a need for highly stain resistant bead films that have a low coefficient of friction, good abrasion resistance, and sufficient hardness. It would be further advantageous if such films were also thermoformable. It would be even more advantageous if such films exhibited resistance to organic solvents.

SUMMARY

The present disclosure provides dual cure, stain resistant, bead films which are stain resistant to highly staining materials such as yellow mustard, blood, wine, etc., even at elevated temperature and humidity, and also exhibit a low coefficient of friction, good abrasion resistance, and sufficient hardness. In some embodiments such bead films are thermoformable. In some embodiments such bead films are resistant to organic solvents.

The present disclosure provides resin systems that include fluoropolymers such as fluoroolefins and fluorourethanes. Fluorourethanes include crosslinked fluorinated polyurethanes. Such resin systems may be employed in conjunction with additional resin layers such as polyesters, acrylics, epoxies, and polyurethanes including polyurethane dispersions, two part urethane (meaning the two components, isocyanate and hydroxyl compound, are combined at the time of coating), urethanes coated from solvent, and 100% solids two part urethanes.

In one aspect, the present disclosure provides an article comprising at least a first surface having: (a) a binder resin layer comprising a fluorine-containing polymer, wherein the binder resin layer has a first major surface opposite a second major surface; and (b) a plurality of microspheres partially embedded and adhered to the first major surface of the binder resin layer; wherein the fluorine-containing polymer is a partially fluorinated polymer derived from at least one fluorine containing monomer and two or more non-fluorinated monomers having at least one active hydrogen functional group, and further wherein at least one but not all of the active hydrogen functional groups are reacted with at least one curing agent having latent functionality.

In some embodiments, the partially fluorinated polymer comprises a copolymer of the structure of Formula (I):

  (I)

wherein $R_f$ must be present as 30 mol % to 60 mol % of the polymer, and wherein $R_X$ must be present as 5 mol % to 20 mol % of the polymer, and further wherein $R_L$ and $R_G$ comprises the remaining mol % of the polymer, (a) $R_f$ is selected from at least one of the following or combinations thereof:

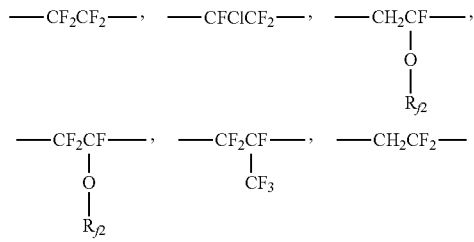

wherein $R_{f2}$ is fluoroalkyl having 1 to 8 carbon atoms;
(b) $R_X$ is:

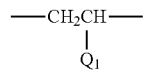

wherein $Q_1$ is

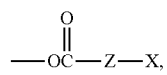

or

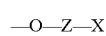

wherein Z is optional, or when present, is selected from an alkylene, arylene, aralkylene or alkarylene, in which any are optionally substituted with N, O or S; and wherein X is OH, or SH, or $NHR_1$, where $R_1$ is H, alkyl or cycloalkyl having 1 to 22 carbon atoms;

(c) $R_L$ is

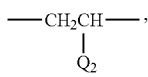

wherein $Q_2$ is

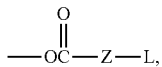

or,

wherein Z is optional, or when present, is selected from an alkylene, arylene, aralkylene, or alkarylene, in which any are optionally substituted with N, O or S and
L is

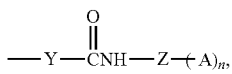

or

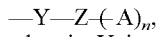

wherein Y is O, S, $NR_1$, wherein $R_1$ is H, or alkyl or cycloalkyl having 1 to 22 carbon atoms, and
A is

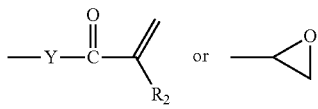

wherein n is 1 to 5 and $R_2$ is H or $CH_3$; and
(d) $R_G$ is

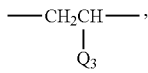

wherein $Q_3$ is

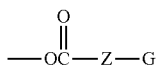

or

wherein Z is optional, or when present is selected from an alkylene, arylene, aralkylene, or alkarylene in which any are optionally substituted with N, O or S. and wherein G is aryl, alkyl, aralkyl or alkaryl.

In some embodiments $R_f$ must be present as 30 mol % to 60 mol % of the polymer; $R_X$ must be present as 5 mol % to 15 mol % of the polymer; and $R_L$, and $R_G$ comprises the remaining mol % of the polymer.

In some embodiments, the binder resin layer further comprises a condensation polymer or an acrylic polymer. In some embodiments, the non-fluorinated monomer is a hydroxy-containing monomer. In some embodiments, the partially fluorinated polymer has a number molecular weight of greater than or equal to 9000 g/mol.

In some embodiments, the binder resin layer further comprises a crosslinker. In some embodiments, the crosslinker comprises polyisocyanate with latent functionality. In some embodiments, the approximate percent equivalents of crosslinker to equivalents of total active hydrogen functionality is between 7% and 25%. In some embodiments, the approximate percent equivalents of crosslinker to equivalents of total active hydrogen functionality is between 10% and 15%. In some embodiments, the curing agent comprises polyisocyanate.

In some embodiments, the plurality of microspheres are selected from at least one of glass, polymers, glass ceramics, ceramics, metals and combinations thereof. In some embodiments, at least about 60% of the surface of the article is covered with the plurality of microspheres. In some embodiments, a reinforcing layer disposed along the second major surface of the binder resin layer. In some embodiments, the reinforcing layer comprises at least one of polyurethane resins, acrylic resins, polyester resins, epoxy resins, and combinations thereof. In some embodiments, the polyurethane material is selected from polyurethane dispersions, two part urethanes coated from solvent, 100% solids two part urethanes, and combinations thereof.

In some embodiments, the fluorine content along the polymeric backbone of the fluorine-containing polymer is from about 25% to 72% by weight. In some embodiments, the article is a thermoformable article.

In another aspect, the present disclosure provides a thermoset article derived from the articles of any of the foregoing embodiments. In some embodiments, the thermoset article is a three-dimensional shaped thermoset article.

In some embodiments, curing of the thermoset article is accomplished by actinic radiation curing. In some embodiments, the thermoset cured article exhibits a stain resistance to yellow mustard at elevated temperature and humidity as measured by the change in b* of less than 50. In some embodiments, thermoset cured article exhibits a pencil hardness of greater than or equal to 9H at 7.5 Newtons. In some embodiments, the cured thermoset article is resistant to organic solvents. In some embodiments, the cured thermoset article exhibits a coefficient of friction of less than 0.3.

In yet another aspect, the present disclosure provides an article comprising at least a first surface having: (a) a binder resin layer comprising a fluorine-containing polymer, wherein the binder resin layer has a first major surface opposite a second major surface; and (b) a plurality of microspheres partially embedded and adhered to the first major surface of the binder resin layer; where the fluorine-containing polymer is a partially fluorinated polymer derived from at least one fluorine containing monomer and two or more non-fluorinated monomers having at least one active hydrogen functional group, and further where at least one but not all of the active hydrogen functional groups are reacted with at least one curing agent having latent functionality, where the curing agent comprises polyisocyanate. In some embodiments, the binder resin layer further comprises a crosslinker.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Figure 1A:
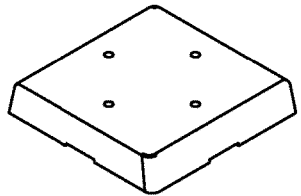
FIG. 1A is a front perspective view of one embodiment of a thermoformable article according to the present disclosure.

Before any embodiments of the invention are explained in detail, it is to be understood that the invention is not limited in its application to the details of construction and the arrangement of components set forth in the following description. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Any numerical range recited herein includes all values from the lower value to the upper value. For example, if a concentration range is stated as 1% to 50%, it is intended that values such as 2% to 40%, 10% to 30%, or 1% to 3%, etc., are expressly enumerated. These are only examples of what is specifically intended, and all possible combinations of numerical values between and including the lowest value and the highest value enumerated are to be considered to be expressly stated in this application.

The term "total active hydrogen functionality" as used herein means all equivalents of active hydrogen functionality present in the partially fluorinated polymer before reacting with curing agent or crosslinker.

The term "alkyl" as used herein means a saturated hydrocarbon substituent wherein one hydrogen atom is removed from the hydrocarbon and replaced with a covalent bond to a molecule or polymer. Alkyl groups include any alkyls having one to twenty two carbon atoms. An alkyl group can independently be linear, branched, or cyclic. Exemplary alkyl groups include methyl, ethyl, propyl, isopropyl, n-butyl, t-butyl, sec-butyl, iso-butyl, 2-ethyl hexyl, iso-octyl, dodecyl, hexadecyl, and the like.

The term "aryl" as used herein means an aromatic substituent wherein one hydrogen atom is removed and replaced with a covalent bond to a molecule or polymer. An aryl substituent can include only carbon and hydrogen or may also include one or more heteroatoms. Exemplary aryl substituents include benzyl, furanyl, naphthyl, anthracenyl, acridinyl, and the like.

The term "aralkyl" as used herein means a substituent including an alkyl component and an aryl component, wherein one hydrogen is removed from either the aryl portion or the alkyl portion and replaced with a bond to a molecule or polymer. Exemplary aralkyl substituents include xylyl, toluenyl, and the like.

The term "alkenyl" as used herein means an unsaturated hydrocarbon substituent having one or more carbon-carbon double bonds, wherein one hydrogen atom is removed from the hydrocarbon and replaced with a covalent bond to a molecule or polymer. Alkenyl groups include monounsaturated or polyunsaturated alkenyls having four to twenty two carbon atoms. Exemplary alkenyl groups include linoleyl, oleyl, myristoyl, palmitoyl, hexadicatrienyl, eicosatrienyl, eicosapentaenyl, arachidonyl, docosadienyl, adrenyl, and the like.

The term "alkylene" as used herein means a saturated hydrocarbon substituent wherein two hydrogen atoms are removed from the hydrocarbon and each is replaced with a covalent bond to one or more molecules or polymers. Alkylenes include any alkylene having one to twenty two carbon atoms, such as any alkylene having one to sixteen carbon atoms. Exemplary alkylene groups include methylene, ethylene, propyl, isopropylene, n-butylene, t-butylene, sec-butylene, iso-butylene, 2-ethyl hexylene, iso-octylene, dodecylene, hexadecylene, and the like.

The term "arylene" as used herein means an aromatic substituent wherein two hydrogen atoms are removed and each is replaced with a covalent bond to a molecule or polymer. Suitable arylenes include benzylene, furanylene, piperidylene, naphthylene, and the like.

The term "aralkylene" as used herein means a substituent including an alkyl component and an arylcomponent, wherein a total of hydrogen atoms are removed from either the aryl portion, the alkyl portion or both and each is replaced with a bond to a molecule or polymer. Aralkylene groups include such as xylylene, toluenylene, and the like.

The term "decorative article" as used herein means articles that have a coefficient of retro reflection of less than or equal to 1.0 candelas/lux/square meter. In some preferred embodiments, the presently disclosed articles have a coefficient of retro reflection of less than or equal to 0.5 candelas/lux/square meter. In some more preferred embodiments, the presently disclosed articles have a coefficient of retro reflection of less than or equal to 0.1 candelas/lux/square meter.

The present disclosure provides thermoformable articles having at least a first surface that includes a binder resin layer having a fluorine-containing polymer where the binder resin layer has a first major surface opposite a second major surface; and a plurality of microspheres partially embedded in the first major surface of the binder resin layer and adhered thereto, where the fluorine-containing polymer is a partially fluorinated polymer derived from two or more non-fluorinated monomers having at least one functional group, and also where at least one but not all of the functional groups are reacted with at least one curing agent having latent functionality. The present disclosure also provides thermoset articles made using these thermoformable articles.

The fluorine-containing polymers useful in the present disclosure include those that include "dual cure chemistry". The term "dual cure chemistry" as used herein refers to condensation and free radical mechanisms as dual reaction mechanisms. For example, formulations that first create covalent bonds through a first condensation mechanism, such as two part urethane chemistry, are useful for making a binder resin layer according to the present disclosure. Thermoformable articles made using these binder resin layers are at most lightly crosslinked and may be thermoformed and then subsequently cured via a free radical or acid catalyzed cure mechanism to cure latent functionalities, such as for example (meth)acrylates, (meth)acrylamides, epoxides, and the like to further crosslink the binder resin layer into a thermoset. Thermoforming thermosets is very difficult as the crosslinks prevent appreciable elongation, which is required in thermoforming complex shapes. The increase in crosslink density results in higher film hardness and stain resistance, both desirable features for the presently disclosed thermoformable articles.

In some embodiments, for example, when reacting a polyol with a monoisocyanate acrylate (i.e. isocyanato ethylmethacrylate), a covalent bond is formed but polymer crosslinking does not occur until an actinic radiation curing step in which actinic radiation is used to polymerize the methacrylate groups. In some embodiments, for example, when reacting a polymeric polyol with two or more hydroxy groups with a diisocyanate acrylate (i.e. Desmolux D100), a covalent bond is formed and polymer crosslinking may occur prior to any further crosslinking due to subsequent actinic radiation.

In some embodiments, it is preferred that the article is stain resistant. In some embodiments, it is preferred that the article is resistant to organic solvents. In order for the article to be stain resistant and/or resistant to organic solvents, the materials in the article, such as the binder resin layer, must have certain properties.

First, when the article is exposed to highly staining agents, such as yellow mustard, blood, wine, etc. it must be resistant to the staining agent. If the article is not stain resistant then the decorative products to which it is applied may lose their aesthetic appeal even while retaining their functionality. However stain resistance under ambient conditions (e.g., 23° C. (73° F.) and 50% relative humidity) is insufficient. The decorative products to which the articles of the disclosure may be applied may be exposed to elevated temperatures and humidity. While many materials may provide adequate stain resistance at ambient conditions they often fail to provide sufficient stain resistance when exposed to more demanding environments for prolonged times, such as at 66° C. (150° F.) and 85% relative humidity for 72 hours.

When the article is exposed to highly staining agents it is necessary for the outer surface to be both resistant to discoloration at the surface as well as impervious to penetration into the subsurface by the staining agent.

While not wishing to be bound by theory, it is believed that any, or all, of surface energy, crystallinity, solubility parameters, crosslink density, and film surface continuity characteristics play a role in providing resistance to surface discoloration and/or subsurface penetration. While fluoropolymers are generally known to possess desirable properties that may improve stain resistance they are difficult to process and adhere to. It has now been found that certain fluorine-containing polymers may be suitably processed, and adhered to, to provide articles having a high degree of stain resistance. Unexpectedly, there was found to be a large variation in the degree of stain resistance exhibited by the various fluorine-containing materials evaluated. Thus not all fluorine-containing polymers are suitable for use in the present disclosure. Surprisingly, it was found that the selection of particular amounts and locations of the fluorine atoms in the fluorine-containing polymer of the binder resin when combined with the presently disclosed curing agent provide sufficient stain resistance with microsphere film manufacture and use. In particular, it was surprising that the use of such fluorine-containing polymers in the binder resin layer provided equivalent adhesion to the microspheres, while yielding some improvements in durability of the resulting microsphere articles, when compared to non-fluorinated binder resin layers.

It was also surprisingly discovered that the number and placement of functional groups in the non-fluorinated monomers used in the presently disclosed fluorine-containing polymers reduced staining and degradation by solvents in the resulting thermoformed articles after curing. These benefits were recognized while maintaining the ability to thermoform the materials, including satisfactory surface characteristics related to uniformity in placement, distribution and depth of embedment of microspheres used in the resulting thermoformed articles.

Desired durability criteria for the presently disclosed thermoset articles are a low coefficient of friction, which affects the feel of the surface of the article and its aesthetic appeal, good abrasion resistance so as to be wear resistant, and sufficient hardness to resist deformation. Coefficient of friction values of less than or equal to 0.3 are desirable for some embodiments of the present disclosure. Pencil hardness values of, for example, of 3H at a force of 5 Newtons, or 1H at a force of 7.5 Newtons, or harder, are desirable for some embodiments of the present disclosure. In some embodiments, the pencil hardness is greater than or equal to 9H at a force of 7.5 Newtons.

Articles made according to the present disclosure are preferably thermoformable articles. In some embodiments, these articles are thermoset articles. The present disclosure contemplates thermoformable and/or thermoset articles useful across a range of shapes, sizes, and configurations. In some embodiments, the thermoformable and/or thermoset articles are substantially flat. In the course of thermoforming, some articles may be deformed and permanently strained or stretched. In some embodiments, the thermoformable and/or thermoset articles are three dimensional, such as, for example, a five sided box. In some embodiments, the corners or edges can have sharp angles, such as 90 degree angles or higher. Without wishing to be bound by theory, it is believed that the strain on the materials used to make these types of 3 dimensional articles can range from 40 to 50% strain. In some embodiments useful in the present disclosure, the thermoformable and/or thermoset articles have more gradual contours, such as, for example, sloped or curved edges. Without wishing to be bound by theory, it is believed that the strain on these more gradual contoured 3 dimensional articles is lower than the aforementioned 3 dimensional articles. For example, strains in the range of 10 to 20% strain may be observed in articles having more gradual contours. Additionally strains less than 10% are sometimes observed.

In some embodiments, the presently disclosed thermoset articles exhibits a stain resistance to yellow mustard at elevated temperature and humidity as measured by the change in b* of less than 50, preferably less than 30, and more preferably 20. In some embodiments, the cured thermoset article is resistant to organic solvents, such as for example methyl ethyl ketone, as well as ethyl acetate.

Previously taught constructions have not combined thermoformability and stain resistance to highly staining materials at elevated temperatures and humidity with low coefficient of friction surface and pencil hardness characteristics using dual cured fluorine-containing polymers.

Transfer Carrier

The transfer coating method of the present disclosure can be used to form the presently disclosed microsphere transfer article from which can be formed the presently disclosed microsphere article. The microsphere article has a surprisingly improved aesthetics.

The presently disclosed transfer carrier includes a support layer and a thermoplastic release layer bonded thereto. The thermoplastic release layer of the transfer carrier temporarily partially embeds a plurality of transparent microspheres. The transfer carrier has low adhesion to the plurality of transparent microspheres and to the binder resin layer in which the opposite sides of the plurality of transparent microspheres are partially embedded, so that the transfer carrier can be removed to expose the surface of the plurality of transparent microspheres.

Support Layers

The support layer should be "dimensionally stable". In other words it should not shrink, expand, phase change, etc. during the preparation of the transfer article. Useful support layers may be thermoplastic, non-thermoplastic or thermosetting, for example. One skilled in the art would be able to select a useful support layer for the presently disclosed transfer article. If the support layer is a thermoplastic layer it should preferably have a melting point above that of the thermoplastic release layer of the transfer carrier. Useful support layers for forming the transfer carrier include but are not limited to those selected from at least one of paper and polymeric films such as biaxially oriented polyethylene terephthalate (PET), polypropylene, polymethylpentene and the like which exhibit good temperature stability and tensile strength so they can undergo processing operations such as bead coating, adhesive coating, drying, printing, and the like.

Thermoplastic Release Layers

Useful thermoplastic release layers for forming the transfer carrier include but are not limited to those selected from at least one of polyolefins such as polyethylene, polypropylene, organic waxes, blends thereof, and the like. Low to medium density (about 0.910 to 0.940 g/cc density) polyethylene is preferred because it has a melting point high enough to accommodate subsequent coating and drying operations which may be involved in preparing the transfer article, and also because it releases from a range of adhesive materials which may be used as the binder resin layer, in addition to the plurality of transparent microspheres.

The thickness of the thermoplastic release layer is chosen according to the microsphere diameter distribution to be coated. The binder resin layer embedment becomes approximately the complement image of the transfer carrier embedment. For example, a transparent microsphere which is embedded to about 30% of its diameter in the release layer of the transfer carrier is typically embedded to about 70% of its diameter in the binder resin layer. To maximize slipperiness and packing density of the plurality of microspheres, it is desirable to control the embedment process so that the upper surface of smaller microspheres and larger microspheres in a given population end up at about the same level after the transfer carrier is removed.

In order to partially embed the plurality of transparent microspheres in the release layer, the release layer should preferably be in a tacky state (either inherently tacky and/or by heating). The plurality of transparent microspheres may be partially embedded, for example, by coating a plurality of transparent microspheres on the thermoplastic release layer of the transfer carrier followed by one of (1)-(3):(1) heating the microsphere coated transfer carrier, (2) applying pressure to the microsphere coated transfer carrier (with, for example, a roller) or (3) heating and applying pressure to the microsphere coated transfer carrier.

For a given thermoplastic release layer, the microsphere embedment process is controlled primarily by temperature, time of heating and thickness of the thermoplastic release layer. As the thermoplastic release layer is melted, the smaller microspheres in any given population will embed at a faster rate and to a greater extent than the larger microspheres because of surface wetting forces. The interface of the thermoplastic release layer with the support layer becomes an embedment bounding surface since the microspheres will sink until they are stopped by the dimensionally stable support layer. For this reason it is preferable that this interface be relatively flat.

The thickness of the thermoplastic release layer should be chosen to prevent encapsulation of most of the smaller diameter microspheres so that they will not be pulled away from the binder resin layer when the transfer carrier is removed. On the other hand, the thermoplastic release layer must be thick enough so that the larger microspheres in the plurality of transparent microspheres are sufficiently embedded to prevent their loss during subsequent processing operations (such as coating with the binder resin layer, for example).

Microspheres

Microspheres useful in the present disclosure can be made from a variety of materials, such as glass, polymers, glass ceramics, ceramics, metals and combinations thereof. In some embodiments, the microspheres are glass beads. The glass beads are largely spherically shaped. The glass beads are typically made by grinding ordinary soda-lime glass or borosilicate glass, typically from recycled sources such as from glazing and/or glassware. Common industrial glasses could be of varying refractive indices depending on their composition. Soda lime silicates and borosilicates are some of the common types of glasses. Borosilicate glasses typically contain boria and silica along with other elemental oxides such as alkali metal oxides, alumina etc. Some glasses used in the industry that contain boria and silica among other oxides include E glass, and glass available under the trade designation "NEXTERION GLASS D" from Schott Industries, Kansas City, Mo., and glass available under the trade designation "PYREX" from Corning Incorporated, New York, N.Y.

The grinding process yields a wide distribution of glass particle sizes. The glass particles are spherodized by treating in a heated column to melt the glass into spherical droplets, which are subsequently cooled. Not all the beads are perfect spheres. Some are oblate, some are melted together and some contain small bubbles.

Microspheres are preferably free of defects. As used herein, the phrase "free of defects" means that the microspheres have low amounts of bubbles, low amounts of irregular shaped particles, low surface roughness, low amount of inhomogeneities, low amounts undesirable color or tint, or low amounts of other scattering centers.

While not wishing to be bound by theory, it is believed that when microspheres are randomly applied in a full monolayer on a surface, they naturally have substantially uniform spacing because they are packed reasonably closely. However, if microspheres are randomly applied with lower area coverages, such as between 30% and 50% coverage, then they do not necessarily produce uniform spacing. For example, in some cases, clusters of several microspheres can form either by random or by electrostatic attraction leaving other areas on the surface void of microspheres. By first forming a more densely packed layer of microspheres and subsequently stretching the surface of the article, a more uniform spacing of microspheres can occur compared to a random placement of microspheres.

In some embodiments, the microspheres are transparent and have a refractive index of less than about 1.60. In some embodiments, the microspheres are transparent and have a refractive index of less than about 1.55. In some embodiments, the microspheres are transparent and have a refractive index of less than about 1.50. In some embodiments, the microspheres are transparent and have a refractive index of less than about 1.48. In some embodiments, the microspheres are transparent and have a refractive index of less than about 1.46. In some embodiments, the microspheres are transparent and have a refractive index of less than about 1.43. In some embodiments, the microspheres are transparent and have a refractive index of less than about 1.35 or less.

Particle Sizing

The microspheres are typically sized via screen sieves to provide a useful distribution of particle sizes. Sieving is also used to characterize the size of the microspheres. With sieving, a series of screens with controlled sized openings is used and the microspheres passing through the openings are assumed to be equal to or smaller than that opening size. For microspheres, this is true because the cross-sectional diameter of the microsphere is almost always the same no matter how it is oriented to a screen opening. It is desirable to use as broad a size range as possible to control economics and maximize the packing of the microspheres on the binder layer surface. However, some applications may require limiting the microsphere size range to provide a more uniform microsphere coated surface. In some embodiments, a useful range of average microsphere diameters is about 5 micrometers to about 200 micrometers (typically about 35 to about 140 micrometers, preferably about 35 to 90 micrometers, and most preferably about 38 to about 75 micrometers). A small number (0 to 5% by weight based on the total number of microspheres) of smaller and larger microspheres falling outside the 20 to 180 micrometer range can be tolerated. In some embodiments, a multi-modal size distribution of microspheres is useful.

In some embodiments, to calculate the "average diameter" of a mixture of microspheres one would sieve a given weight of particles such as, for example, a 100 gram sample through a stack of standard sieves. The uppermost sieve would have the largest rated opening and the lowest sieve would have the smallest rated opening. For the present disclosure, the average cross-sectional diameter can be effectively measure by using the following stack of sieves.

| U.S. Sieve Designation No. | Nominal Opening (micrometers) |
|---|---|
| 80 | 180 |
| 100 | 150 |
| 120 | 125 |
| 140 | 106 |
| 170 | 90 |
| 200 | 75 |
| 230 | 63 |
| 270 | 53 |
| 325 | 45 |
| 400 | 38 |

Alternately, average diameter can be determined using any commonly known microscopic methods for sizing particles. For example, optical microscopy or scanning electron microscropy, and the like, can be used in combination with any image analysis software. For example, software commercially available as free ware under the trade designation "IMAGE J" from NIH, Bethesda, Md.

Adhesion Promoter

In some embodiments, the microspheres are treated with an adhesion promoter such as those selected from at least one of silane coupling agents, titanates, organo-chromium complexes, and the like, to maximize their adhesion to the binder resin layer, especially with regard to moisture resistance.

The treatment level for such adhesion promoters is on the order of 50 to 1200 parts by weight adhesion promoter per million parts by weight microspheres. Microspheres having smaller diameters would typically be treated at higher levels because of their higher surface area. Treatment is typically accomplished by spray drying or wet mixing a dilute solution such as an alcohol solution (such as ethyl or isopropyl alcohol, for example) of the adhesion promoter with the microspheres, followed by drying in a tumbler or auger-fed dryer to prevent the microspheres from sticking together. One skilled in the art would be able to determine how to best treat the microspheres with an adhesion promoter.

Binder Resin Layer

In some embodiments, the binder resin layer includes a condensation polymer or an acrylic polymer. In some embodiments, the binder resin layer includes a fluorine-containing organic polymeric material. The transparent microspheres are partially embedded in the first major surface of the binder resin layer and adhered thereto. The binder resin layer should exhibit good adhesion to the transparent microspheres themselves or to the treated microspheres. It is also possible that an adhesion promoter for the microspheres could be added directly to the binder resin layer itself as long as it is compatible within the process window for disposing the binder resin layer on the surfaces of the microspheres. It is important that the binder resin layer has sufficient release from the thermoplastic release layer of the transfer carrier to allow removal of the transfer carrier from the microspheres, which are embedded on one side in the thermoplastic release layer and on the other side in the binder resin layer. In the dual cure stain resistant articles of the present disclosure the exposed bead surfaces are not covered by the binder resin layer.

The binder resin layer of the present disclosure is selected such that the resulting articles exhibit stain resistance to yellow mustard at elevated temperature and humidity. The binder resin is also selected to have capability for covalent bonding to the microspheres and the microspheres may be designed to have functionality reactive to the binder resin. In one aspect, the microspheres are functionalized with aminosilanes with the silane bonding to the glass microsphere producing a pendent amine. As amines are strong nucleophiles, the choice of binder resins containing isocyanate functionality provides a simple and fast reaction to form a urea linkage connecting the beads covalently to the binder resin.

In some embodiments, the binder resin is also selected to have pendent hydroxyl groups for reaction with polyisocyanates to build molecular weight through condensation polymerization. The binder resin is also selected to have free radically polymerizable functionality such as (meth)acrylate groups, so that the presently disclosed materials may be thermoformed and then free radically crosslinked to make a thermoset article. As a result, the surface of the thermoset article becomes more rigid leading to higher pencil hardness values and more crosslinked so that solvents and staining agents are less able to penetrate the surface. The selection of binder resins with fluorine in the backbone in combination with the free radical crosslinking leads to resistance to staining by mustard and other colored staining agents.

It has been surprisingly found that the partially-fluorinated polymer of the binder resin layer exhibits desirable stain and solvent resistance characteristics because the presently disclosed partially fluorinated polymers are derived from at least one partially-fluorine containing monomer and two or more non-fluorinated monomers having at least one active hydrogen functional group, where at least one but not all of the active hydrogen functional groups are reacted with at least one curing agent having latent functionality. In some embodiments, the partially fluorinated polymer has a number molecular weight of greater than or equal to 9000 g/mol. It was unexpectedly found that the desired stain resistance properties did not necessarily correspond with those materials having the lowest surface energies.

Such stain resistance characteristics have also unexpectedly been found to be related to the amount and location of the fluorine atoms in the fluorine-containing polymer of the binder resin. It was found that the selection of particular amounts and locations of the fluorine atoms in the fluorine-containing polymer of the binder resin when combined with the presently disclosed curing agent provide sufficient stain resistance in the resulting thermoset articles. In particular, it was surprising that the use of such fluorine-containing polymers in the binder resin layer provided good adhesion to the microspheres, in addition to durability and stain resistance of the resulting thermoset microsphere articles.

In some embodiments, this may be calculated by taking into account both the weight ratios of the monomers included, as well as the fluorine content by weight of each monomer along its polymerizable chain length, including fluorine atoms that are present on those atoms once removed from the polymerizable chain. As an example, a copolymer of tetrafluoroethylene, hexafluoropropylene, and vinylidene fluoride in a weight ratio of 10:40:50 would have a backbone fluorine content of 67.7%. In some embodiments, this can be calculated as follows.

Tetrafluoroethylene: C2F2, molecular weight 100.01, monomeric fluorine content 76.0%, weight ratio 10%;

Hexafluoropropylene: C3F6, molecular weight 150.02, monomeric fluorine content 76.0%, weight ratio 40%;

Vinylidene fluoride: C2H2F2, molecular weight 64.03, monomeric fluorine content 59.3%, weight ratio 50%.

(0.1×0.76)+(0.4×0.76)+(0.5×0.593)]×100=67.7%.

Note that this calculation includes the fluorine atoms on the trifluoromethyl group of hexafluoropropylene since it is only one atom removed from the polymerizable chain of the hexafluoropropylene monomer.

In some embodiments of the present disclosure the fluorine content along the polymeric backbone of the fluorine-containing polymer is from about 25% to about 72% by weight.

Although there may be fluorine-containing materials which possess the desired fluorine content they may not exhibit the desired level of stain resistance to highly staining materials, such as yellow mustard, at elevated temperature and humidity. Without wishing to be bound by theory, it is believed that those materials in which the fluorine atoms reside solely, or predominately, in pendent side chains or end group do not exhibit the desired stain resistance characteristics of the articles of the present disclosure. While materials in which the fluorine atoms reside solely, or predominately, in pendent side chains or end group may provide adequate stain resistance to yellow mustard at room temperature and humidity they have been found to not do so at elevated temperature and humidity.

The fluorine-containing polymer of the binder resin is desirably coatable out of solvent or from an aqueous dispersion. Use of solvent coating or aqueous dispersions provides advantages such as lower processing temperatures which in turn permits the use of materials such as polyethylene in the transfer carrier. Lower process temperatures also generally result in decreased thermal stress in the final articles. In addition, the use of certain higher boiling solvents may advantageously provide articles with reduced amounts of entrapped air in the dried and cured binder resin layer.

In addition to being coatable from solvent or aqueous dispersions, the fluorine-containing materials of the binder resin layer desirably form a continuous film upon drying. Without being bound by theory, it is believed that film continuity, i.e., free of pinholes and other discontinuities, contributes to the resistance of the articles of the present disclosure to highly staining materials such as yellow mustard, blood, wine, etc. It is also believed that such film continuity contributes to enhanced mechanical properties as well as improving bead transfer from the transfer carrier to the binder resin layer.

It was also surprisingly found that for some embodiments of the present disclosure it was not necessary to employ a surface treatment prior to providing an optional reinforcing layer. Typically fluoropolymers are surface treated prior to bonding them to other materials. Such treatments include plasma, corona, and chemical etching, e.g., sodium etch.

Binder resins useful in the binder resin layer include partially fluorinated polymers derived from two or more non-fluorinated monomers having at least one functional group, where at least one but not all of the functional groups are reacted with at least one curing agent having latent functionality. In some embodiments, the fluorine-containing polymer useful in the present disclosure is derived from at least one partially fluorinated, or non-fluorinated, monomer with reactive functionality, some of which are further reacted with at least one curing agent having latent functionality. In some embodiments, the binder resin layer further comprises a condensation polymer or an acrylic polymer. In some embodiments the non-fluorinated monomer is a hydroxy-containing monomer.

In some embodiments, the binder resin layer comprises a partially fluorinated polymer derived from at least one fluorine containing monomer and two or more non-fluorinated monomers having at least one active hydrogen functional group, where at least one but not all of the active hydrogen functional groups are reacted with at least one curing agent having latent functionality, and where the curing agent comprises polyisocyanate.

The present disclosure provides partially-fluorinated polymers derived from the structure of Formula (I), described below.

 (I)

where $R_f$ must be present as 30 mol % to 60 mol % of the polymer; $R_X$ must be present as 5 mol % to 20 mol % of the polymer; and $R_L$ and $R_G$ comprises the remaining mol % of the polymer. In some embodiments, $R_f$ must be present as 30 mol % to 60 mol % of the polymer; $R_X$ must be present as 5 mol % to 15 mol % of the polymer; and $R_L$ and $R_G$ comprises the remaining mol % of the polymer.

And further where $R_f$ in Formula (I) is selected from at least one of the following or combinations thereof:

—CFClCF$_2$—,

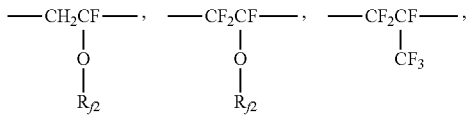

—CH$_2$CF$_2$— where R$_{f2}$ is fluoroalkyl having 1 to 8 carbon atoms.
And also where R$_X$ in Formula (I) is

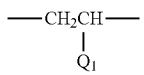

where Q$_1$ is

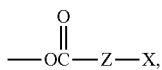

or

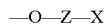

where Z is optional, or when present, is selected from an alkylene, arylene, aralkylene or alkarylene, in which any are optionally substituted with N, O or S; and where X is OH, or SH, or NHR$_1$, where R$_1$ is H, alkyl or cycloalkyl having 1 to 22 carbon atoms.
And also where R$_L$ in Formula (I) is

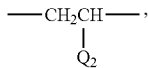

where Q$_2$ is

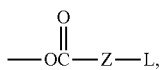

or

where Z is optional, or when present, is selected from an alkylene, arylene, aralkylene, or alkarylene in which any are optionally substituted with N, O or S and
L is

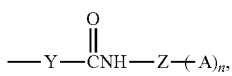

or

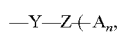

where Y is O, S, NR$_1$, where R$_1$ is H, or alkyl or cycloalkyl having 1 to 22 carbon atoms, and
A is

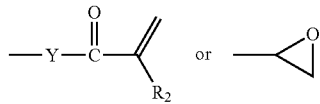

where n is 1 to 5 and R$_2$ is H or CH$_3$.
R$_G$ is

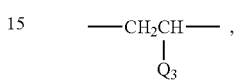

where Q$_3$ is

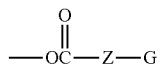

or

where Z is optional, or when present is selected from an alkylene, arylene, aralkylene, or alkarylene in which any are optionally substituted with N, O or S. and where G is aryl, alkyl, aralkyl or alkaryl.

In any of the foregoing embodiments, units R$_f$, R$_X$, R$_L$, R$_G$ may be arranged head-head, head-tail, tail-head, or tail-tail as in:

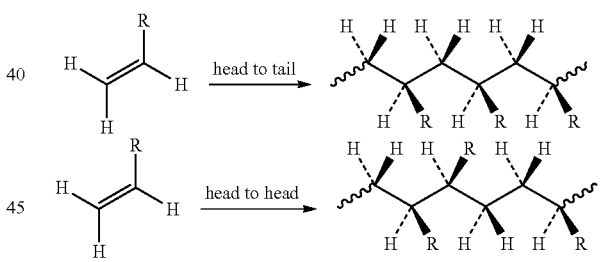

CN 101314684 and CN 101319113, for example, disclose ZEFFLE GK 570 as having a fluorine content of 35-40%. JP 2010182862, for example, discloses ZEFFLE GK 570 as having a fluorine content of 35%. The forgoing documents are incorporated herein by reference in their entirety.

Chlorotrifluoroethylene (CTFE) polyhydroxy containing polymers may also be useful in the present invention. Exemplary CTFE polyhydroxy containing polymers include those available under the trade designation LUMIFLON from Asahi Glass Chemicals American, Bayonne, N.J.

In some embodiments, the binder resin may include nonfluorinated polyols in addition to fluorinated polyols, as long as they are miscible in solution and in the dried and cured products. The binder resin may include monoalcohols, in limited amounts. The monoalcohol may also possess latent functionality, such as acrylate groups (e.g. hydroxyethylacrylate), or be fluorinated to enhance chemical resistance (e.g. N-methyl, N-butanol perfluorobutanesulfonamide).

Exemplary curing agents useful in the present disclosure include those having latent functionality in that there is at least one type of functionality present in the curing agent that polymerizes in a manner that does not interfere with and is stable in the presence of polymerization of at least one other type of functionality present in the curing agent. For example, curing agents useful in the present disclosure include molecules having at least some functionality useful for condensation curing and at least some functionality useful for free radical polymerization. Condensation polymerizations and/or thermal catalysis, such as those using isocyanates, are enhanced by heating. Free radically polymerizable groups, such as (meth)acrylates, are stable within a range of temperatures commonly used for condensation polymerization. In some embodiments, curing agents useful in the present disclosure include those having isocyanate or epoxy functionality combined with (meth)acrylate functionality. Preferable curing agents useful in the present disclosure include those having isocyanate functionality combined with (meth)acrylate functionality. Examples include 1,1-bis (acryloyloxymethyl) ethyl isocyanate (BEI) isocyanatoethyl acrylate (AOI), and isocyanatoethyl methacrylate (MOI), which may be obtained from CBC America Corp, Commack, N.Y., and DESMOLUX D-100, which may be obtained from Bayer, Pittsburgh, Pa., and LAROMER 9000 available from BASF. When using polyisocyanates as curing agents, these polyisocyanates may also function as crosslinkers, where crosslinking means having two or more isocyanate groups that are capable of reacting with two different polymeric chains.

These curing agents preferably include latent functionality such that the thermoformable articles can be converted into thermoset articles. For example, in some embodiments, curing is accomplished by actinic radiation curing of the thermoformed article. Exemplary actinic radiation curing includes curing by exposure of the thermoformed article to an ultraviolet (UV) light source. Various photoinitiators can be used in the presently disclosed thermoformed articles. In some embodiments, it is preferable to use photoinitiators having longer wavelength absorption. Alternatively, in some embodiments, curing is accomplished by exposure of the thermoformed article to electron beam irradiation. In some embodiments, curing is accomplished by thermally initiated curing. Photoinitiators useful in the present disclosure include those commercially available under the trade designations "IRGACURE" (e.g. Irgacure 651) and "DAROCURE" (e.g. Darocure 1173) from BASF, Ludwigshafen, Del. and "ESACURE" (e.g. Esacure KB1) from Lamberti, Gallarate, IT. Suitable UV curing apparatus and the light sources are well known to those skilled in the art and include for example those commercially available under the trade designation "Fusion" from Heraus Noblelight Fusion UV, Gaithersburg, Md. Crosslinkers useful in the present disclosure include polyisocyanates which are useful for reaction with the microspheres as well as to the pendent hydroxyl groups on the fluorine containing polymer. An examples of such polyisocyanates is given below in Formula (II)

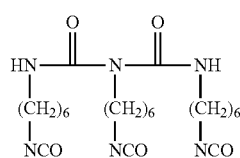
(II)

Exemplary compounds of Formula (II) are commercially available. Exemplary compounds of Formula (II) can be obtained from Bayer Polymers LLC (Pittsburgh, USA). One such compound is obtainable under the trade designation DESMODUR N100.

Other exemplary polyisocyanates include those having structures according to the following Formulas (III) and (IV):

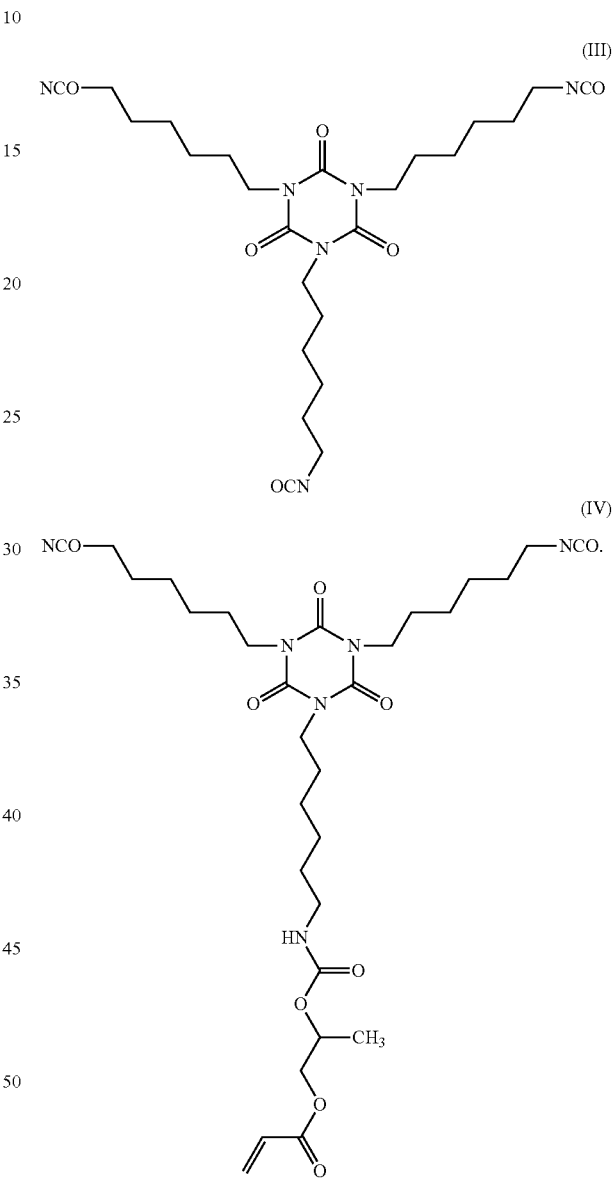

Many of the multifunctional isocyanates of greater than 2 functionality, including that of Formula (III), exist as a distribution of materials. For instance, hexamethylene diisocyanate based isocyanate oligomers such as biuret multi-isocyanates (for instance those available under the trade designation DESMODUR N100) exist as a mixture of hexamethylene diisocyanate, hexamethylene diisocyanate biuret trimers, hexamethylene diisocyanate biuret pentamers, hexamethylene diisocyanate biuret heptamers, and so on. The same is true for hexamethylene diisocyanate based isocyanurate multi-isocyanates (for instance those available under the trade designation DESMODUR N3300). Biuret and isocyanurate multi-isocyanates may be based on other diisocyanates such as isophorone diisocyanate, or toluene diisocyanate. Diisocyanates such as H12MDI (available under the trade designation DESMODUR W, Bayer) may also be employed. Other multifunctional isocyanates which are useful as crosslinkers include those with additional acrylate functionality, for example that commercially available under the trade designation DESMODUR D100 (from Bayer, presently commercially available under the trade designation EBECRYL 4150 from Allnex, Alpharetta, Ga.). DESMODUR D100 has an NCO functionality of about 2 and can act as a crosslinker.

The binder resin layer may be transparent, translucent, or opaque. The binder resin layer may, for example, be clear and colorless or pigmented with opaque, transparent, or translucent dyes and/or pigments. In some embodiments, inclusion of specialty pigments, such as for example metallic flake pigments, can be useful. The binder resin may also include additional free radically curable additives, including acrylate functional monomers and acrylate functional polymers.

The binder resin layer is typically formed on the transfer carrier after the transparent microspheres have been partially embedded in the release layer of the transfer carrier. The binder resin layer is typically coated over the partially embedded transparent microspheres by a direct coating process but could also be provided over the transparent microspheres via thermal lamination either from a separate carrier or by first forming the binder resin layer on a separate substrate from which it is subsequently transferred to cover the transparent microspheres.

In the presently disclosed transfer and microsphere coated articles, the plurality of transparent microspheres are typically disposed on the first major surface of the binder resin layer to provide sufficient pencil hardness and abrasion characteristics.

In some embodiments the binder resin layer is continuous such that there is no break either in the areas between, or beneath, the microspheres in the stain resistant articles of the invention. In another embodiment, the binder resin layer is continuous in the areas between the microspheres, although it may not be present beneath the microspheres in the stain resistant articles of the invention. In the latter embodiment the microspheres themselves are providing the desired stain resistant characteristics where the binder resin layer is absent.

Reinforcing Layers

The presently disclosed microsphere coated articles and transfer articles can optionally comprise one or more reinforcing layer(s). Examples of suitable reinforcing layers include polyurethane resin systems, acrylic resin, polyester resins, epoxy resins, and combinations thereof. Suitable polyurethane resin systems include, but are not limited to, those selected from at least one of: polyurethane dispersions, two part urethanes coated from solvent, 100% solids two part urethanes, and combinations thereof. Suitable acrylic resin systems include, but are not limited to, those selected from UV-curable acrylic resin systems and thermally curable acrylic resin systems. Such systems may be solvent coated, aqueous dispersions, or hot melt coated. One suitable type of polyester resin are co-amorphous polyester resins. Suitable epoxy resin systems include, but are not limited to, those selected from at least one of two part and one part epoxy resins. Such reinforcing layers may be formed on the surface of the binder resin layer opposite that of the bead-containing transfer carrier. The reinforcing layer can serve to provide advantageous handling characteristics, and in doing so permit the use of thinner layers of binder resin.

Substrate Layers

The presently disclosed microsphere coated articles and transfer articles can optionally comprise one or more substrate layer(s). Examples of suitable substrate layers include but are not limited to those selected from at least one of fabrics (including synthetics, non-synthetics, woven and non-woven such as nylon, polyester, etc.), polymer coated fabrics such as vinyl coated fabrics, polyurethane coated fabrics, etc.; polymeric matrix composites; leather; metal; paint coated metal; paper; polymeric films or sheets such as acrylics, polycarbonate, polyurethanes such as thermoplastic polyurethanes, polyesters including amorphous or semi-crystalline polyesters such as polyethylene terephthalate, elastomers such as natural and synthetic rubber, and the like. The substrates may, for example, be in the form of a clothing article; automobile, marine, or other vehicle seat coverings; automobile, marine, or other vehicle bodies; orthopedic devices; electronic devices, hand held devices, household appliances, and the like.

The present disclosure also provides stain resistant articles which are thermoformable or stretchable. In order for the article to be thermoformable or stretchable, the materials in the article must have certain properties.

First, when the article is formed, the article must retain its formed dimensions. If the article has high elasticity, it can recover when the forming stresses are removed, essentially undoing the forming step. Therefore, high elasticity can be problematic. This issue can be avoided by using materials that undergo melt flow at or near the forming or stretching temperature. In other cases, a component of the article can have elasticity at the forming temperature, but this elasticity is likely to exert a recovery force after forming. To prevent this elastic recovery, the elastic layer can be laminated with a material that does not show this elasticity. For example, this inelastic material can be a thermoplastic material.

The other criterion for the article to be formable is that it can bear the elongation that occurs during forming or stretching without failing, cracking, or generating other defects. This can be achieved by using materials that have a temperature at which they undergo melt flow and conducting the forming step near that temperature. In some cases, crosslinked materials that do not flow can be used, but they are more likely to crack during the elongation. To avoid this cracking, the crosslink density should be kept low, as can be indicated by a low storage modulus in the rubbery plateau region. The expected degree of crosslinking can also approximated as the inverse of the average molecular weight per crosslink, which can be calculated based on the components of a material. In addition, it is preferred to do the forming at relatively low temperatures, since as temperatures increase above the glass transition temperature of crosslinked materials, their capacity for elongation begins to decrease.

Thermoformable materials suitable for use in articles of the present disclosure include polycarbonate, polyurethanes such as thermoplastic polyurethanes, and polyesters including amorphous or semi-crystalline polyesters such as polyethylene terephthalate.

Graphic Layer Options

The present disclosed binder resin layer can optionally also perform the function of acting as the adhesive for a desired substrate and/or further comprise pigment(s) such that it also has a graphic function.

The binder resin layer, when selected to function also as a substrate adhesive graphic image, may be, for example, pigmented and provided in the form of an image, such as, for example, by screen printing the binder resin in the form of a graphic for transfer to a separate substrate. However, the binder resin layer, in some instances, is preferably colorless and transparent so that it can allow transmission of color from either a substrate, separate graphic layers (discontinuous colored polymeric layers) placed below it, or from a separate substrate adhesive that is optionally colored and optionally printed in the form of a graphic image (a discontinuous layer).

Typically, if a graphic image is desired it is provided separately on the surface of the binder resin layer opposite the plurality of transparent microspheres by at least one colored polymeric layer. The optional colored polymeric layer may, for example, comprise an ink. Examples of suitable inks for use in the present disclosure include but are not limited to those selected from at least one of pigmented vinyl polymers and vinyl copolymers, acrylic and methacrylic copolymers, urethane polymers and copolymers, copolymers of ethylene with acrylic acid, methacrylic acid and their metallic salts, and blends thereof. The colored polymeric layer, which can be an ink, can be printed via a range of methods including, but not limited to screen printing, flexographic printing, offset printing, lithography, transfer electrophotography, transfer foil, and direct or transfer xerography. The colored polymeric layer may be transparent, opaque, or translucent.

A colored polymeric layer(s) may be included in the articles of the present disclosure by a number of procedures. For example, a transfer carrier can have a layer of transparent microspheres embedded in the release layer thereof, following which the microsphere embedded surface of the release layer is coated with a transparent layer of binder. This microsphere and adhesive coated transfer carrier can function as a casting liner by coating, for example, a continuous colored plasticized vinyl layer over the binder resin layer and wet laminating a woven or non-woven fabric thereover.

Another method involves providing graphic layers (discontinuous colored polymeric layers, for example) on the binder resin layer prior to casting a continuous colored plasticized vinyl layer to approximate the image of leather, for example.

Optional Adhesive Layer(s)

The presently disclosed microsphere coated article and transfer article may each optionally further comprise one or more adhesive layers. A substrate adhesive layer, for example, may optionally be included in the article in order to provide a means for bonding the binder layer or the layer(s) of material optionally bonded to the binder layers to a substrate. A substrate adhesive layer (as well as any other optional adhesive layers) may be selected from those generally known in the art such as, for example, pressure sensitive adhesives, moisture curing adhesives, and hot melt adhesives (i.e. those applied at elevated temperatures). Examples of such materials, include, for example, (meth) acrylics, natural and synthetic rubbers including block copolymers, silicones, urethanes, and the like. However, each adhesive layer used must be selected such that it will adhere the desired layers together. For example, a substrate adhesive layer must be selected such that it can adhere to an intended substrate as well as to the other layer to which it is bonded.

The optional adhesive layer, when present, may be continuous in some embodiments or discontinuous in some embodiments. Typically, the substrate layer, when present, is continuous, although it may be discontinuous. By continuous it is meant that within the outermost boundaries of the adhesive layer there are no areas left uncovered by the adhesive layer. Discontinuous means there may be areas present that are not covered by the adhesive layer. Such adhesive layers may be disposed on a surface opposite that of the first major surface of the binder resin layer.

Adhesives useful in the presently disclosed adhesive layer(s) include polymeric compositions useful to adhere together two adherends. Examples of adhesives are pressure sensitive adhesives, heat activated adhesives and laminating adhesives.

Pressure sensitive adhesive compositions are well known to those of ordinary skill in the art to possess properties including the following: (1) aggressive and permanent tack at room temperature, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process. Heat activated adhesives are non-tacky at room temperature but become tacky and capable of bonding to a substrate at elevated temperatures. These adhesives usually have a Tg or melting point (Tm) above room temperature. When the temperature is elevated above the Tg or Tm, the storage modulus usually decreases and the adhesive become tacky.

Laminating adhesives (also sometimes referred to as contact adhesives) are adhesives designed to form bonds to two substrates immediately after dispensing. Once the adhesive has been dispensed, there is a limited time, sometimes referred to as "open time" in which the adhesive can form a bond to two substrates. Once the open time has elapsed, the laminating adhesive is no longer capable of forming adhesive bonds. Examples of laminating adhesives are hot melt adhesives, solutions or dispersions of polymeric materials or materials curable to form polymeric materials in a liquid medium, and curable adhesives. The laminating adhesive is coated onto a substrate, a second substrate is contacted to the adhesive surface and the formed three layer construction is cooled, dried, and/or cured to form a laminate. Examples of laminating adhesives include the glue sticks used in hot glue guns (which are hot melt types of adhesives that form bonds upon cooling), casein glues, sometimes called "white glue", (which are water-borne dispersions that form bonds upon drying), and cyanoacrylate adhesives (which cure to form bonds upon exposure to air).

Stain resistant, articles of the present disclosure may comprise a binder resin layer only, or a binder resin layer in combination with one or more of a reinforcing layer, substrate layer, graphic layer, or adhesive layer.

In the stain resistant articles of the present disclosure the substrate layers, graphic layers, and adhesive layers, when present, may be disposed on a surface other than the first major surface of the binder resin layer. For example, such stain resistant articles may comprise a binder resin layer having a first and second major surface, a plurality of microspheres partially embedded in, and adhered thereto, the first major surface of the binder resin layer, a reinforcing layer having a first and second major surface which is formed with its' first major surface in contact with the second major surface of the binder resin layer, an adhesive layer having a first and second major surface with its' first major surface in contact with the second major surface of the reinforcing layer, and a substrate layer having a first and second major surface with its' first major surface in contact with the second major surface of the adhesive layer. Alternatively, the adhesive layer may be absent and the first major surface of the substrate layer may be in contact with the second major surface of the reinforcing layer.

For some applications, it can be desirable to obtain specific bead surface area coverages. In some embodiments, at least about 40% of the surface of the article is covered with the plurality of microspheres. In some embodiments, at least about 60% of the surface of the article is covered with the plurality of microspheres. In some embodiments, the article has at least a portion of a first major surface covered with the plurality of microspheres with coverage greater than or equal to 30% of that portion of the first major surface. In some embodiments, the article has at least a portion of a first major surface covered with the plurality of microspheres with coverage less than or equal to 50% of that portion of the first major surface. In some embodiments, the percent of area covered by microspheres in one area of the film can be one coverage density, such as about 71%. In some embodiments, the percent of area covered by microspheres in another area of the film can be the same or different coverage density, such as 47%. In some embodiments, the percent of area covered by microspheres in yet another area of the film can be the same or different coverage density, such as 44%. In some embodiments, the presently disclosed articles include a plurality of microspheres that are substantially uniformly spaced.

A non-limiting list of exemplary embodiments and combinations of exemplary embodiments of the present disclosure are disclosed below:

Embodiment 1

An article comprising at least a first surface having:
(a) a binder resin layer comprising a fluorine-containing polymer, wherein the binder resin layer has a first major surface opposite a second major surface; and
(b) a plurality of microspheres partially embedded and adhered to the first major surface of the binder resin layer;
wherein the fluorine-containing polymer is a partially fluorinated polymer derived from at least one fluorine containing monomer and two or more non-fluorinated monomers having at least one active hydrogen functional group, and further wherein at least one but not all of the active hydrogen functional groups are reacted with at least one curing agent having latent functionality.

Embodiment 2

The article of Embodiment 1 wherein the partially fluorinated polymer comprises a copolymer of the structure of Formula (I):

 (I)

wherein $R_f$ must be present as 30 mol % to 60 mol % of the polymer, and wherein $R_X$ must be present as 5 mol % to 20 mol % of the polymer, and further wherein $R_L$ and $R_G$ comprises the remaining mol % of the polymer,
(a) $R_f$ is selected from at least one of the following or combinations thereof:

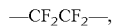

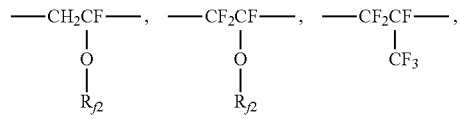

—CH$_2$CF$_2$— wherein $R_{f2}$ is fluoroalkyl having 1 to 8 carbon atoms;
(b) $R_X$ is:

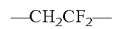

wherein $Q_1$ is

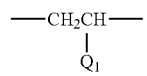

or

—O—Z—X wherein Z is optional, or when present, is selected from an alkylene, arylene, aralkylene or alkarylene, in which any are optionally substituted with N, O or S; and wherein X is OH, or SH, or NHR$_1$, where R$_1$ is H, alkyl or cycloalkyl having 1 to 22 carbon atoms;
(c) $R_L$ is

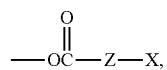

wherein $Q_2$ is

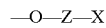

or,

—O—Z-L wherein Z is optional, or when present, is selected from an alkylene, arylene, aralkylene, or alkarylene, in which any are optionally substituted with N, O or S and
L is

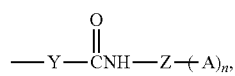

or

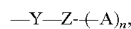

wherein Y is O, S, NR$_1$, wherein R$_1$ is H, or alkyl or cycloalkyl having 1 to 22 carbon atoms, and A is

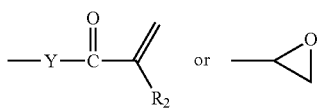

wherein n is 1 to 5 and $R_2$ is H or $CH_3$; and
(d) $R_G$ is

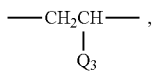

wherein $Q_3$ is

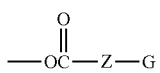

or

wherein Z is optional, or when present is selected from an alkylene, arylene, aralkylene, or alkarylene in which any are optionally substituted with N, O or S. and wherein G is aryl, alkyl, aralkyl or alkaryl.

Embodiment 3

The article of Embodiment 2 wherein $R_f$ must be present as 30 mol % to 60 mol % of the polymer; $R_X$ must be present as 5 mol % to 15 mol % of the polymer; and $R_L$ and $R_G$ comprises the remaining mol % of the polymer.

Embodiment 4

The article of Embodiment 1 or 2 wherein the binder resin layer further comprises a condensation polymer or an acrylic polymer.

Embodiment 5

The article of any of the preceding embodiments wherein the non-fluorinated monomer is a hydroxy-containing monomer.

Embodiment 6

The article of any of the preceding embodiments wherein the partially fluorinated polymer has a number molecular weight of greater than or equal to 9000 g/mol.

Embodiment 7

The article of any of the preceding embodiments wherein the binder resin layer further comprises a crosslinker.

Embodiment 8

The article of any of the preceding embodiments wherein the crosslinker comprises polyisocyanate with latent functionality.

Embodiment 9

The article of any of Embodiment 8 wherein the approximate percent equivalents of crosslinker to equivalents of total active hydrogen functionality is between 7% and 25%.

Embodiment 10

The article of any of Embodiment 8 wherein the approximate percent equivalents of crosslinker to equivalents of total active hydrogen functionality is between 10% and 15%.

Embodiment 11

The article of any of the preceding embodiments wherein the curing agent comprises polyisocyanate.

Embodiment 12

The article of the preceding embodiments wherein the plurality of microspheres are selected from at least one of glass, polymers, glass ceramics, ceramics, metals and combinations thereof.

Embodiment 13

The article of any of the preceding embodiments wherein at least about 60% of the surface of the article is covered with the plurality of microspheres.

Embodiment 14

The article of any of the preceding embodiments further comprising a reinforcing layer disposed along the second major surface of the binder resin layer.

Embodiment 15

The article of Embodiment 14 wherein the reinforcing layer comprises at least one of polyurethane resins, acrylic resins, polyester resins, epoxy resins, and combinations thereof.

Embodiment 16

The article of Embodiment 15 wherein the polyurethane material is selected from polyurethane dispersions, two part urethanes coated from solvent, 100% solids two part urethanes, and combinations thereof.

Embodiment 17

The article of any of the preceding embodiments wherein the fluorine content along the polymeric backbone of the fluorine-containing polymer is from about 25% to 72% by weight.

Embodiment 18

The article of any of the preceding embodiments wherein the article is a thermoformable article.

Embodiment 19

A thermoset article derived from the articles of any of the preceding embodiments.

Embodiment 20

The thermoset article of Embodiment 19 is a three-dimensional shaped thermoset article.

Embodiment 21

The thermoset article of Embodiment 19 or 20 wherein curing is accomplished by actinic radiation curing.

Embodiment 22

The thermoset article of Embodiments 19 to 21 wherein the thermoset article exhibits a stain resistance to yellow mustard at elevated temperature and humidity as measured by the change in b* of less than 50.

Embodiment 23

The thermoset article of Embodiments 19 to 22 wherein the thermoset article exhibits a pencil hardness of greater than or equal to 9H at 7.5 Newtons.

Embodiment 24

The thermoset article of Embodiments 19 to 23 wherein the thermoset article is resistant to organic solvents.

Embodiment 25

The thermoset article of Embodiments 19 to 24 wherein the thermoset article exhibits a coefficient of friction of less than 0.3.

Embodiment 26

An article comprising at least a first surface having:

(a) a binder resin layer comprising a fluorine-containing polymer, wherein the binder resin layer has a first major surface opposite a second major surface; and (b) a plurality of microspheres partially embedded and adhered to the first major surface of the binder resin layer;

wherein the fluorine-containing polymer is a partially fluorinated polymer derived from at least one fluorine containing monomer and two or more non-fluorinated monomers having at least one active hydrogen functional group, and further wherein at least one but not all of the active hydrogen functional groups are reacted with at least one curing agent having latent functionality, wherein the curing agent comprises polyisocyanate.

Embodiment 27

The article of Embodiment 26 wherein the binder resin layer further comprises a crosslinker.

Various modifications and alterations of this invention will become apparent to those skilled in the art without departing from the scope and spirit of this invention.

EXAMPLES

Materials

| Designation | Description |
| --- | --- |
| PI | 2,2-Dimethoxy-1,2-diphenylethan-1-one, available under the trade designation IRGACURE 651 from BASF Corporation, Vandalia, IL |
| PCPBT | Polycarbonate/Polyester Blend Film commercially available under the trade designation BAYFOL CR 6-2 000000 from Bayer Material Science Deerfield MA. Prior to use this was plasma treated generally as described in U.S. Pat. No. 8,634,146 at column 13, line 65 to column 14, line 30, with the following modifications. The width of the drum electrode was 108 cm (42.5 inches); the tetramethyl silane deposition step was not employed; during the treatment step 1000 standard cubic centimeters of nitrogen was used in place of oxygen, and the operating pressure was 90 milliTorr, and a plasma treatment time of 30 seconds. |
| PET-1 | A clear, amorphous, copolyester film having a nominal thickness of 0.13 mm (0.005 inches) or 0.25 mm (0.010 inches) and a glass transition temperature of 80° C. (DSC), available as under the trade designation EASTAR 6763 from Eastman Chemical Company, Kingsport, TN. Prior to use this was corona treated under a nitrogen atmosphere at 500 milliJoules/square centimeter. |
| FPOH 3 | N-methyl, N-butanol perfluorobutanesulfonamide, $C_4F_9SO_2N(CH_3)(CH_2)_3CH_2OH$, prepared as described in Example 7 of U.S. Pat. No. 2,803,656 with a MW of 357 g/mol. |
| ICN 1 | A solvent free, polyfunctional, aliphatic isocyanate resin based hexamethylene diisocyanate (HDI) having an equivalent weight of approximately 193, an NCO content of 21.8%, and a monomeric HDI content of 0.2% maximum, available under the trade designation DESMODUR N3300A from Bayer Materials Science LLC, Pittsburgh, PA. |
| ICN 2 | A liquid cycloaliphatic diisocyanate, dicyclohexylmethane diisocyanate, having an equivalent weight of 132 maximum, an NCO content of 31.8% minimum, and a solidification point of 25° C., available under the trade designation DESMODUR W from Bayer Materials Science LLC, Pittsburgh, PA. |
| ICN 3 | A liquid monoisocyanate and acrylate functional resin, 2-acryloyloxyethyl isocyanate, CAS No 13641-96-8 with an equivalent weight of 141, available under the trade designation KARENZ AOI, from Showa Denko, imported by CBC America, Commack, NY |
| ICN 4 | A liquid monoisocyanate and methacrylate functional resin 2-methacryloyloxyethyl isocyanate, CAS No 30674-80-7 with an equivalent weight of 155, available under the trade designation KARENZ MOI, from Showa Denko, imported by CBC America Commack, NY |

| Designation | Description |
|---|---|
| ICN 5 | DESMOLUX D 100, an isocyanate bearing urethane acrylate, from Bayer Materials Science LLC, Pittsburgh, PA and an NCO content of 11.8 to 13.8 wt %. The Bayer Material Science DLX formable film technology guide lists the functionality of DESMOLUX D100 is about 2.0 NCO groups and 1.0 acrylate groups. |
| POH 2 | Polytetramethylene ether glycol, a waxy solid having a molecular weight of 625-675, a hydroxyl number of 166-180, and a melting point of 11-19° C., available under the trade designation TERATHANE 650 from Invista, Wichita, KS. |
| POH 3 | A liquid diol having a molecular weight of 90 and a boiling point of 23° C., available as 1,4-butanediol from Chemtura Corporation, Middlebury, CT. |
| FPOH 1 | A 63.7 wt % solids solution in n-butyl acetate of a copolymer of tetrafluoroethylene and vinyl monomers, having a hydroxyl value of 63 mg KOH/gram resin which is suitable for reaction with isocyanates, available under the trade designation ZEFFLE GK 570 from Daikin America, Orangeburg, NY. This is believed to contain 35-40% fluorine by weight and GPC analysis (PS standards) gives a Mn of 9500 g/mol. |
| FPOH 2 | A 100% solids copolymer of chlorotrifluoroethylene and vinyl monomers, with hydroxyl functionality, suitable for reaction with isocyanates under the trade designation LUMIFLON LF 200F with an equivalent weight of 1145 from AGC Chemicals Americas, Bayonne, NJ,. GPC analysis gives a Mn of 12,600 g/mol. |
| T12 | Dibutyltin dilaurate (DBTDL), a liquid catalyst, available under the trade designation DABCO T-12 from Air Products and Chemicals, Incorporated, Allentown, PA. |
| MEK | methyl ethyl ketone |
| Ethyl Acetate | ethyl acetate |
| Soda lime silicate microsphere beads | Silane treated soda lime silicate microsphere beads having an average size in the range of 44-53 micrometers, a refractive index of 1.52 as determined by the standard Becke line method, and a density of 2.52 g/cc, obtained from Swarco Industries, Incorporated, Columbia, TN. |
| Borosilicate glass powder | Milled borosilicate glass powder having a size distribution of less than 200 mesh and density of 2.23 g/cc, available under the trade designation PYREX 7740 from Strategic Materials Incorporated, Houston TX. |
| SILQUEST A1100 | Gamma-Aminopropyltrimethoxysilane, a clear liquid coupling agent, sold under the trade designation "SILQUEST A1100" from Momentive Performance Materials Incorporated, Columbus, OH. |

Test Methods

Stain Resistance—Mustard

Free standing bead films and laminates thereof were labeled and provided with a circle having diameter of 5.08 cm (2 inches) on their backside (i.e., opposite the exposed bead surface) using a permanent marking pen. A sheet of white bond paper was placed under the sample and a Hunter Labs MiniScan EZ spectrophotometer (Model #4500L, Hunter Associates Laboratory, Incorporated, Reston, Va.) was used to measure the L*, a*, and b* in the center of the circle from the frontside (i.e., surface having the exposed beads) of the film or laminate. Next, French's 100% Natural Classic Yellow Mustard was applied and uniformly distributed on the frontside of the film within the boundary of the circle using a cotton swab. Samples prepared in this manner were placed in a heat and humidity chamber at a temperature of 66° C. (150° F.) and a relative humidity of 80% for a time of 72 hours. Upon removal from the chamber the films were rinsed with warm water and wiped with a paper towel to remove the remaining material from the test surface. Care was taken not to rupture the film during this process. After drying, L*, a*, and b* were measured as before and the change in the b* value was reported. The b* parameter was selected since it is a measure of the blue-yellow as defined in the CIE (International Commission on Illumination) 1976 Color Space. Values of 50 or less, or 30 or less, or even 20 or less are desirable.

Solvent Resistance Testing (MEK)

Except where noted, free-standing bead films were evaluated for solvent resistance as described in ASTM D5402-06 (2011) Method A using the following parameters. The solvent was MEK (methyl ethyl ketone). A cheesecloth was used. The sample size was 5.1 by 2.5 cm (2 inches by 1 inch). The tested samples were evaluated under with a microscope at 100× using reflected light. The area rubbed with solvent was inspected for loss of beads by counting the number of beads in the field. If 10% or less of the beads were observed to be missing the sample was rated "Pass". If more than 10% of the beads were observed to be missing the sample was rated "Fail".

Coefficient of Friction Testing

Free-standing bead film samples were evaluated for coefficient of friction using a table top peel tester. A 3.2 mm (0.013 inch) thick elastomeric foam having a density of about 0.25 g/cc was bonded to a flat steel substrate measuring 63.5 mm (2.5 inches) square, having a thickness of about 6 mm (0.024 inches), and weighing approximately 200 grams including the foam. Next, a free-standing bead film having a length of 63.5 mm (2.5 inches) that was approximately 5 mm (0.20 inch) longer than the substrate was place over the foam covered surface of the substrate such that the film was wrapped around the leading edge of the substrate. A hole was cut in the film to accommodate the pin by which the substrate was pulled during testing. This test article was placed with the film side down on an isopropyl alcohol wiped glass surface measuring at least 15.2 cm by 25.4 cm (6 inches by 10 inches). A table top peel tester was used in the coefficient of friction mode to pull the test article across the glass surface at a rate of about 2.29 meters/minute (90 inches/minute) for at least about 5 seconds. The transducer was calibrated with the force from the weight of the steel substrate with foam as 1.00. In this way pulling forces were directly read out as coefficient of friction (COF). The dynamic (kinetic) coefficient of friction was determined by evaluating the graph of the COF values beginning one second after the start of the measurement. Data was collected at a rate of ten readings/second and the average was recorded. Three samples were run for each film and the average of these three coefficient of friction measurements was reported. Values of 0.3 or less are desirable.

Pencil Hardness

Free-standing bead films were evaluated for pencil hardness according to ASTM D 3363. Abrasive sandpaper (Grit No. 400) was adhered to a flat and smooth benchtop with double coated tape. Pencil leads (Turquoise Premium pencil leads (9H to 6B in hardness) from Prismacolor Professional Art Supplies, a subsidiary of Newell Rubbermaid Office Products, Oak Brook, Ill.) Totiens Drawing Leads with mechanical lead holder) were held at an angle of 90° to the abrasive paper and abraded until a flat, smooth, circular cross-section was achieved, free of chips or nicks on the edge of the lead. The force on the tip of the pencil was fixed at 7.5 N or in some cases less. The free-standing bead film was placed on a glass surface. Using a freshly prepared pencil lead for each test, the lead was pressed firmly against the film at a 45° angle and at the desired load using an Elcometer 3086 Motorised Pencil Hardness Tester (obtained from Elcometer Incorporated, Rochester Hills, Mich.) and drawn across the test panel in the "forward" direction for a distance of at least 0.635 cm (0.25 inch). Three pencil tracks were made for each grade of lead hardness. Prior to inspection, crumbled lead was removed from the test area using a damp paper towel wetted with isopropyl alcohol. The film was inspected by eye for defects and under an optical microscope (50×-1000× magnification) for the first 0.317 cm to 0.635 cm (0.125 inch to 0.25 inch) of each pencil track. Moving from harder leads to softer, the process was repeated down the hardness scale until a pencil was found that did not scratch the film or rupture it, or dislodge or partially dislodge any beads. At least two of three tracks at each lead hardness were required to meet these criteria in order to pass. The hardest level of lead that passed was reported as the pencil hardness of the film. Values of 3H at a force of 5 Newtons, or harder, are desirable.

Method for Making Bead Film Transfer Article

Borosilicate Bead Carrier

Borosilicate glass powder was passed through a flame treater twice by passing them through a hydrogen/oxygen flame at a rate of 3 grams/minute to form microspheres and were collected in a stainless steel container whereupon metallic impurities were removed using a magnet. The resulting glass microspheres were treated with 600 ppm of SILQUEST A1100 in the following manner. The silane was dissolved in water, then added to the microsphere beads with mixing, air dried overnight, followed by drying at 110° C. for 20 minutes. The dried, silane treated microsphere beads were then sieved to remove any agglomerates and provide beads having a size of 75 micrometers or less and were free flowing. The resulting transparent silane treated microspheres were cascade coated using a mechanical sifter onto a transfer carrier comprising a polyethylene coated polyester substrate liner which had been preheated to about 140° C. (284° F.), to form a bead carrier having a uniform layer of transparent microspheres embedded in the polyethylene layer to a depth corresponding to about 30-40% of their diameter as determined by a magnifying imaging system.

Soda Lime Silicate Bead Carrier

Soda lime silicate microsphere beads were used as received to prepare a bead carrier in the following manner. The glass microsphere beads were treated with 600 ppm of SILQUEST A1100 in the following manner. The silane was dissolved in water, then added to the microsphere beads with mixing, air dried overnight, followed by drying at 110° C. for 20 minutes. The dried, silane treated microsphere beads were then sieved to remove any agglomerates and provide beads having a size of 75 micrometers or less and were free flowing. The resulting transparent silane treated microspheres were cascade coated using a mechanical sifter onto a transfer carrier comprising a polyethylene coated polyester substrate liner which had been preheated to about 140° C. (284° F.), to form a bead carrier having a uniform layer of transparent microspheres embedded in the polyethylene layer to a depth corresponding to about 30-40% of their diameter as determined by a magnifying imaging system.

Synthesis Example A

To a 3.8 liters (1 gallon) clear glass jar was added 1941.2 g (1.389 equivalents) FPOH 1 and 165.1 g (1.065 equivalents) ICN 4. The jar was placed on a mechanical roller and the jar rolled and mixed the contents for 2 hours, at which time the mixture was clear and homogeneous. One milliliter of the clear homogeneous solution was applied to the IR crystal of a ThermoScientific SMART MULTIBOUNCE HATR and the isocyanate absorption peak at ~2300 $cm^{-1}$ was observed when the infrared spectrum was measured. To the mixture was added 1.33 g T12 and the 3.8 liter jar was again placed on the mechanical roller and the jar rolled and mixed the contents for 70 hours, at which time IR analysis showed the disappearance of the isocyanate absorption peak. To the solution was added 11.1 g PI and 87 g ethyl acetate and the contents were mixed by placing the 3.8 liter glass jar on the mechanical roller for 24 hours. The resulting solution was calculated to be 64.1% solids and 76.7% of the hydroxyl equivalents had been reacted with ICN 4.

Synthesis Example B

To a 250 ml amber glass jar was added 105.352 g (0.092 equivalents) of FPOH 2 and 70.24 g ethyl acetate. The jar was placed on a mechanical roller and the jar rolled and mixed the contents for 24 hours, at which time the mixture was clear and homogeneous. To the solution was then added 11.25 g ICN 4 (0.073 equivalents) and the jar was placed on a mechanical roller and the jar rolled and mixed the contents for 1 hours, at which time the mixture was clear and homogeneous. To the mixture was added 108 microliters T12 and the jar was again placed on the mechanical roller and the jar rolled and mixed the contents for 70 hours, at which time IR analysis showed the disappearance of the isocyanate absorption peak. 0.61 g PI was added and the solution was mixed for 1 hour. The resulting solution was calculated to be 62.4% solids and 78.9% of the hydroxyl equivalents had been reacted with ICN 4.

Synthesis Example C

To a 250 ml amber glass jar was added 135.09 g (0.0966 equivalents) FPOH 1 and 12.75 g (0.082 equivalents) ICN 4. The jar was placed on a mechanical roller and the jar rolled and mixed the contents for 2 hours, at which time the mixture was clear and homogeneous. One milliliter of the clear homogeneous solution was applied to the IR crystal of a ThermoScientific SMART MULTIBOUNCE HATR and the isocyanate absorption peak at ~2300 cm$^{-1}$ was observed when the infrared spectrum was measured. To the mixture was added 93 microliters T12 and the jar was again placed on the mechanical roller and the jar rolled and mixed the contents for 70 hours, at which time IR analysis showed the disappearance of the isocyanate absorption peak. To the solution was added 0.50 g PI and the contents were mixed by placing the jar on the mechanical roller for 24 hours. The percent solids were calculated for the resulting solution as 66.7% solids and 84.9% of the hydroxyl equivalents had been reacted with ICN 4.

Synthesis Example D

To a 250 ml amber glass jar was added 137.83 g (0.0986 equivalents) FPOH 1 and 14.25 g (0.092 equivalents) ICN 4. The jar was placed on a mechanical roller and the jar rolled and mixed the contents for 2 hours, at which time the mixture was clear and homogeneous. One milliliter of the clear homogeneous solution was applied to the IR crystal of a ThermoScientific SMART MULTIBOUNCE HATR and the isocyanate absorption peak at ~2300 cm$^{-1}$ was observed when the infrared spectrum was measured. To the mixture was added 94 microliters T12 and the jar was again placed on the mechanical roller and the jar rolled and mixed the contents for 70 hours, at which time IR analysis showed the disappearance of the isocyanate absorption peak. To the solution was added 0.52 g PI and the contents were mixed by placing the jar on the mechanical roller for 24 hours. The resulting solution was calculated to be 67.2% solids and 93.3% of the hydroxyl equivalents had been reacted with ICN 4.

Synthesis Example E

To a 1 liter amber jar was added 461.72 g (0.3303 equivalents) FPOH 1 and 32.53 g (0.2307 equivalents) ICN 3. The jar was placed on a mechanical roller and the jar rolled and mixed the contents for 2 hours, at which time the mixture was clear and homogeneous. One milliliter of the clear homogeneous solution was applied to the IR crystal of a ThermoScientific SMART MULTIBOUNCE HATR and the isocyanate absorption peak at ~2300 cm$^{-1}$ was observed when the infrared spectrum was measured. To the mixture was added 315 microliters T12 and the jar was again placed on the mechanical roller and the jar rolled and mixed the contents for 70 hours, at which time IR analysis showed the disappearance of the isocyanate absorption peak. To the solution was added 1.76 g PI and the contents were mixed by placing the glass jar on the mechanical roller for 24 hours. The resulting solution was calculated to be 66.1% solids and 69.8% of the hydroxyl equivalents had been reacted with ICN 3.

EXAMPLES

Example 1

A solvent based two part urethane was prepared by mixing the following components: 337 grams of the solution of Synthesis Example A (0.212 eq OH from FPOH1 previously reacted with 0.163 eq ICN4) were mixed with 2.57 grams (0.013 eq) ICN 1, 6.49 grams (0.020 eq) of ICN 5, and 39.0 g ethyl acetate in a 0.95 liter (1 quart) jar. The mixture was swirled for 8 minutes at which time the solution was clear and homogeneous. The resulting solution was applied to a 30.5 cm (12 inches) wide soda lime bead carrier, prepared as described above, using a notchbar coater with a 0.1 mm (0.004 inch) gap at a rate of about 1.5 meters/minute (5 feet/minute). The binder resin coated bead carrier was dried in three 3 meter (10 foot) ovens at 90° C. (194° F.), 90° C. (194° F.), and 104° C. (219° F.), respectively. The ratio of isocyanate equivalents between the ICN 4 (from Synthesis A) and the ICN 1 and ICN 5 was 83.1:6.8:10.1/ICN 4:ICN 1:ICN 5. The approximate ratio of total equivalents isocyanate to equivalents hydroxyl was 0.925:1.0. The approximate percent equivalents of crosslinker to equivalents of total active hydrogen functionality was 0.033/0.212=15.6%

Next, a 100% solids, two-part polyurethane mixture was prepared by combining and mixing the following components in a cup using a centrifugal resin mixer (MAX 40 mixing cup and FlackTek Speedmixer DAC 150 FV; both from FlackTek Incorporated, Landrum, S.C.) at 2500 rpm for 30 seconds: 8.33 g ICN 2, 0.76 g ICN 1, 6.05 g ICN 5, 11.36 g POH 2, 2.164 g POH 3, 25 microliters T12, 0.14 g PI. The approximate ratio of equivalents isocyanate to equivalents hydroxyl was 1.025:1. This mixture was then coated between a PET-1 substrate and the exposed surface of the binder resin (first) coating using a notch bar coater with a gap setting of 0.0063 cm (0.0025 inches) greater than the combined thickness of the substrate and the once coated bead carrier.

The resulting twice coated, bead film was cured in five stages as follows: 30 minutes at 40° C. (104° F.); 30 minutes at 50° C. (122° F.); 30 minutes at 60° C. (140° F.); 30 minutes at 70° C. (158° F.); and finally for 45 minutes at 80° C. (176° F.) to provide a transfer article having soda lime silicate beads which were partially embedded in polyethylene on one side and in the fluorourethane with pendent methacrylate binder resin layer on the other, and a coating of polyurethane resin between the fluorourethane with pendent methacrylate binder resin layer and the PET-1 substrate.

A 0.024 cm (0.0095 inches) thick, free-standing bead film having a binder resin layer of fluorourethane with pendent methacrylate groups uniformly coated on one side with partially embedded soda lime silicate microsphere beads and on the other side with a 100% solids-based, two part polyurethane resin and a PET-1 substrate was obtained by removal of the transfer carrier.

Example 2

A solvent based two part urethane was prepared by mixing the following components: 455 grams of the solution of Synthesis Example A (0.2865 eq OH from FPOH1 previously reacted with 0.220 eq ICN 4) were mixed with 12.57 g (0.0383 eq) of ICN 5, and 105.2 g ethyl acetate in a 0.946 liter (1 quart) jar. The mixture was swirled for 8 minutes at which time the solution was clear and homogeneous. The resulting solution was applied to a 30.5 cm (12 inches) wide soda lime bead carrier, prepared as described above, using a notchbar coater with a 0.1 mm (0.004 inch) gap at a rate of about 1.5 meters/minute (5 feet/minute). The binder resin coated bead carrier was dried in three 3 meter (10 foot) ovens at 90° C. (194° F.), 90° C. (194° F.), and 104° C. (219° F.) respectively. The ratio of isocyanate equivalents between the ICN 4 (from Synthesis A) and ICN 5 was 85.2:14.8. The approximate ratio of total equivalents isocyanate to equivalents hydroxyl was 0.90:1.0. The approximate percent equivalents of crosslinker to equivalents of total active hydrogen functionality was 0.0383/0.2865=13.4%

The same two part urethane coating described in Example 1 was also applied to Example 2, identical in chemistry, curing, gap, and substrate.

A 0.024 cm (0.0095 inches) thick, free-standing bead film having a binder resin layer of fluorourethane with pendent methacrylate groups uniformly coated on one side with partially embedded soda lime silicate microsphere beads and on the other side with a 100% solids-based, two part polyurethane resin and a PET-1 substrate was obtained by removal of the transfer carrier.

Example 3

A solvent based two part urethane was prepared by mixing the following components: 186.84 grams of the solution of Synthesis Example B (0.0915 eq OH from FPOH 2 reacted with 0.0726 eq ICN 4) were mixed with 3.75 g (0.0194 eq) ICN 1, and 32 g ethyl acetate in a 0.946 liter (1 quart) jar. The mixture was swirled for 8 minutes at which time the solution was clear and homogeneous. The resulting solution was applied to a 30.5 cm (12 inches) wide soda lime bead carrier, prepared as described above, using a notchbar coater with a 0.1 mm (0.004 inch) gap at a rate of about 1.5 meters/minute (5 feet/minute). The binder resin coated bead carrier was dried in three 3 meter (10 foot) ovens at 90° C. (194° F.), 90° C. (194° F.), and 104° C. (219° F.) respectively. The ratio of isocyanate equivalents between the ICN 4 (from Synthesis B) and the ICN1 was 78.8:21.1 ICN 4:ICN 1. The approximate ratio of equivalents isocyanate to equivalents hydroxyl was 1.0:1.0. The approximate percent equivalents of crosslinker to equivalents of total active hydrogen functionality was 0.0194/0.0915=21.2%

The same two part urethane coating described in Example 1 was also applied to Example 3, identical in chemistry, curing, gap, and substrate.

A 0.027 cm (0.0105 inch) thick, free-standing bead film having a binder resin layer of fluorourethane with pendent methacrylate groups uniformly coated on one side with partially embedded soda lime silicate microsphere beads and on the other side with a 100% solids-based, two part polyurethane resin and a PET-1 substrate was obtained by removal of the transfer carrier.

Example 4

Example 4 was prepared as follows: 0.408 g (0.00114 eq) of FPOH 3 was dissolved in 7.75 g of ethyl acetate. When the FPOH3 dissolved completely, 0.662 g (0.00343 eq) of ICN 1 was added to the solution, along with T12 catalyst at 900 ppm (1.0 microliter) and the mixture was placed on a roller for three hours. All of the mixture was added to a 28.97 g of precursor of Synthesis Example C (0.0189 eq OH from FPOH 1 reacted with 0.016 eq ICN 4) in a 100 g mixing cup and mixed at 2600 rpm for 30 seconds using a centrifugal resin mixer (MAX 40 mixing cup and FlackTek Speedmixer DAC 150 FV; both from FlackTek Incorporated, Landrum, S.C.). The resulting solution was applied to a 30.5 cm (12 inches) wide soda lime bead carrier, prepared as described above, using a notchbar coater with a 0.1 mm (0.004 inch) gap at a rate of about 1.5 meters/minute (5 feet/minute). The binder resin coated bead carrier was dried in three 3 meter (10 foot) ovens at 90° C. (194° F.), 90° C. (194° F.), and 104° C. (219° F.) respectively. The ratio of isocyanate equivalents between the ICN 4 (from Synthesis C) and the ICN 1 (minus the equivalents of the FPOH 3) was 87.6:12.4 ICN 4:ICN 1. The approximate ratio of total equivalents isocyanate to equivalents hydroxyl was 1.0:1.0. The approximate percent equivalents of crosslinker to equivalents of total active hydrogen functionality was (0.00343-0.00114)/0.0189) =0.121=12.1%.

The same two part urethane coating described in Example 1 was also applied to Example 4, identical in chemistry, curing, gap, and utilizing 0.12 mm (0.007 inch) PCPBT as the substrate.

A 0.027 cm (0.0105 inch) thick, free-standing bead film having a binder layer of fluorourethane with pendent methacrylate groups uniformly coated on one side with partially embedded soda lime silicate microsphere beads and on the other side with a 100% solids-based, two part polyurethane resin and a PCPBT substrate was obtained by removal of the transfer carrier.

Example 5

Example 5 was prepared as follows: 1.447 g (0.0041 eq) of FPOH 3 was dissolved in 16.955 g of ethyl acetate. When the FPOH 3 dissolved completely, 2.346 g (0.0122 eq of ICN 1 was added, along with 3.4 microliters of T12 (900 ppm). The mixture was rolled for 3 hours and then added to 60.06 g of Synthesis Example A (0.0378 eq OH from FPOH 1 reacted with 0.0290 eq ICN4) in a 100 g mixing cup. The mixture was centrifugal mixed as described in Example 1 and the resulting solution was applied to a 30.5 cm (12 inches) wide soda lime bead carrier, prepared as described above, using a notchbar coater with a 0.1 mm (0.004 inch) gap at a rate of about 1.5 meters/minute (5 feet/minute). The binder resin coated bead carrier was dried in three 3 meter (10 foot) ovens at 90° C. (194° F.), 90° C. (194° F.), and 104° C. (219° F.) respectively. The ratio of isocyanate equivalents between the ICN 4 (from Synthesis A) and the ICN 1 (minus the equivalents of the FPOH 3) was 78.1:28.9 ICN 4:ICN 1. The approximate ratio of total equivalents isocyanate to equivalents hydroxyl was 1.0:1.0. The approximate percent equivalents of crosslinker to equivalents of total active hydrogen functionality was (0.0122–0.004)/(0.0378)=0.215=21.5%.

The same two part urethane coating described in Example 1 was also applied to Example 5, identical in chemistry, curing, gap, and substrate.

A 0.024 cm (0.0095 inches) thick, free-standing bead film having a binder layer of fluorourethane with pendent methacrylate groups uniformly coated on one side with partially embedded soda lime silicate microsphere beads and on the other side with a 100% solids-based, two part polyurethane resin and a PET-1 substrate was obtained by removal of the transfer carrier.

Example 6

A solvent based two part urethane was prepared by combining and mixing the following components in a cup using a centrifugal resin mixer (MAX 40 mixing cup and FlackTek Speedmixer DAC 150 FV; both from FlackTek Incorporated, Landrum, S.C.) at 400 rpm for 120 seconds: 0.50 g ICN 5 (0.00152 eq), 4.38 g ethyl acetate, 0.07 g PI. To the mixture was then added 21.90 g FPOH 1 0.0156 eq) and the mixture was mixed in the Speedmixer for 30 seconds at 2600 rpm. To the solution was added 13 microliters of T12 catalyst and the mixture was mixed in the Speedmixer for 30 seconds at 2600 rpm. The resulting solution was applied to a 30.5 cm (12 inches) wide borosilicate bead carrier, prepared as described above, using a notchbar coater with a 0.15 mm (0.006 inch) gap at a rate of about 1.5 meters/minute (5 feet/minute). The binder resin coated bead carrier was dried at room temperature for 60 minutes and then for 60 minutes in a forced air oven at 80° C. (176° F.). The percent equivalents of crosslinker to total active hydrogen functionality was 10.0%

Next, a 100% solids, two-part polyurethane mixture was prepared by combining and mixing the following components in a cup using a centrifugal resin mixer (MAX 40 mixing cup and FlackTek Speedmixer DAC 150 FV; both from FlackTek Incorporated, Landrum, S.C.) at 2500 rpm for 30 seconds: 13.3 grams ICN 2, 0.7 grams ICN 1, 14.03 grams POH 2, 2.67 grams POH 3, and 28 microliters (900 ppm) of T12. The approximate ratio of equivalents isocyanate to equivalents hydroxyl was 1.025:1. This mixture was then coated between a 0.12 mm (0.007 inch) PCPBT substrate and the exposed surface of the binder resin (first) coating using a notch bar coater with a gap setting of 0.0063 cm (0.0025 inches) greater than the combined thickness of the substrate and the once coated bead carrier.

A 0.031 cm (0.0124 inch) thick, free-standing bead film having a binder layer of fluorourethane with pendent acrylate groups uniformly coated on one side with partially embedded borosilicate microsphere beads and on the other side with a 100% solids-based, two part polyurethane resin and a PCPBT substrate was obtained by removal of the transfer carrier.

Comparative Example 1

A solvent based two part urethane was prepared by mixing the following components: 152.1 grams of the solution of Synthesis Example D (0.0917 eq ICN 4 reacted with 0.0983 eq OH from FPOH 1) were mixed with 0.75 g (0.0039 eq) ICN 1 in a 0.946 liter (1 quart) jar. The mixture was swirled for 8 minutes at which time the solution was clear and homogeneous. The resulting solution was applied to a 30.5 cm (12 inches) wide soda lime bead carrier, prepared as described above, using a notchbar coater with a 0.1 mm (0.004 inch) gap at a rate of about 1.5 meters/minute (5 feet/minute). The binder resin coated bead carrier was dried in three 3 meter (10 foot ovens) at 90° C. (194° F.), 90° C. (194° F.), and 104° C. (219° F.) respectively. The ratio of isocyanate equivalents between the ICN 4 (from Synthesis D) and the ICN 1 was 96.0:4.0 ICN 4:ICN 1. The approximate ratio of equivalents isocyanate to equivalents hydroxyl was 1.0:1.0. The approximate percent equivalents of crosslinker to equivalents of total active hydrogen functionality was =0.0039/0.0983=0.04=4%.

The same two part urethane coating described in Example 1 was also applied to Comparative Example 1, identical in chemistry, curing, gap, and substrate.

A 0.254 cm (0.10 inch) thick, free-standing bead film having a binder resin layer of fluorourethane with pendent methacrylate groups uniformly coated on one side with partially embedded soda lime silicate microsphere beads and on the other side with a 100% solids-based, two part polyurethane resin and a PET-1 substrate was obtained by removal of the transfer carrier.

Comparative Example 2

A solvent based two part urethane was prepared by mixing the following components: 58.9 g of the solution of Synthesis Example E (0.0274 eq ICN3 reacted with 0.0392 eq OH from FPOH 1) were mixed with 2.37 g (0.0123 eq) of ICN 1, and 15.17 g ethyl acetate in a mixing cup. The mixture was centrifuged for 30 seconds at 2500 rpm. The resulting solution was applied to a 30.5 cm (12 inches) wide borosilicate bead carrier, prepared as described above, using a notchbar coater with a 0.127 mm (0.005 inch) gap at a rate of about 1.5 meters/minute (5 feet/minute). The binder resin coated bead carrier was dried in three 3 meter (10 foot) ovens at 80° C. (176° F.), 80° C. (176° F.), and 90° C. (194° F.) respectively. The coated bead carrier was passed through the ovens for a second time at the same speed and temperatures as employed in the first pass. The ratio of isocyanate equivalents between the ICN 3 (from Synthesis E) and ICN 1 was 69:31. The approximate ratio of isocyanate to equivalents hydroxyl was 1.0:1.0. The approximate percent equivalents of crosslinker to equivalents of total active hydrogen functionality was =(0.0123/0.039)=0.31=31%.

The same two part urethane coating described in Example 1 was also applied to Example CE 2 as described in Example 1 but using 0.18 mm (0.007 inch) thick PCPBT as the substrate.

A 0.029 cm (0.0115 inch) thick, free-standing bead film having a binder layer of fluorourethane with pendent methacrylate groups uniformly coated on one side with partially embedded soda lime silicate microsphere beads and on the other side with a 100% solids-based, two part polyurethane resin and a PCPBT substrate was obtained by removal of the transfer carrier.

Examples 1A to 5A, CE 1A, and CE 2A were obtained by substantial UV curing of the flat films of Examples 1 to 5, CE 1, and CE 2. UV curing was done using bulbs commercially available from Fusion Systems (one H and one D bulb) under nitrogen inertion at 3 meters per minute (10 feet per minute) with 3 passes Total Energy that the examples and comparative examples received per pass during the UV curing process was measured in the UVA, UVB, UVC, and UVV portions of the ultraviolet spectrum as follows: UVA=9043 milliJoules/square centimeter, UVB=2465 milliJoules/square centimeter, UVC=993 milliJoules/square centimeter, and UVV=3243 milliJoules/square centimeter.

Examples 1B to 6B, were obtained by thermoforming and then in a subsequent step UV curing of the Examples 1 to 6 as described for Examples 1A to 5A, CE 1A, and CE 2A. CE 1B and CE 2B were obtained by thermoforming CE 1 and CE 2. CE 1B and CE 2B were not UV cured because they failed during the thermoforming process.

Thermoforming of Bead Film Laminates

Figure 1B:
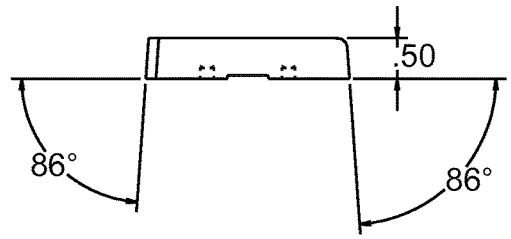
FIG. 1B is a side cross section view of one embodiment of a thermoformable article according to the present disclosure.
Figure 1C:
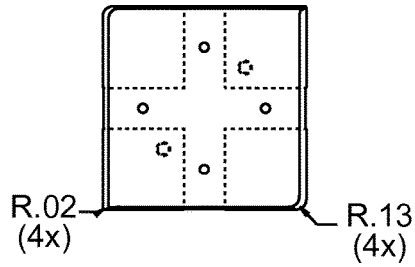
FIG. 1C is a top plan view of one embodiment of a thermoformable article according to the present disclosure.
Figure 1D:
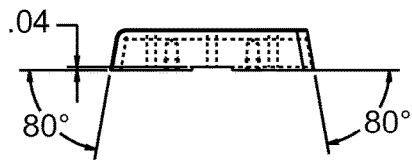
FIG. 1D is a side cross section view of one embodiment of a thermoformable article according to the present disclosure.
Figure 1E:
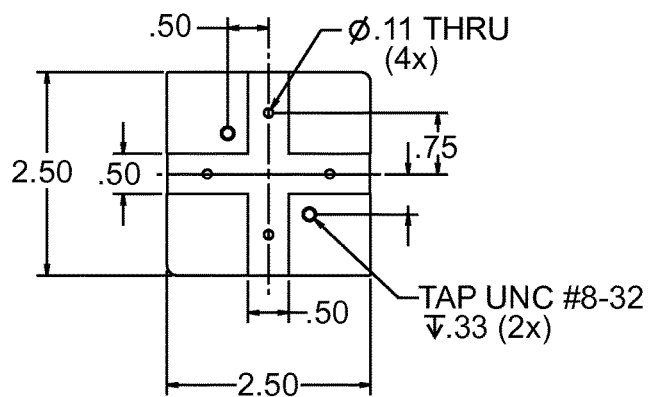
FIG. 1E is a top plan view of one embodiment of a thermoformable article according to the present disclosure.

Thermoformable bead film laminates measuring 20.3 cm (8 inches) square were thermoformed using a COMET thermoformer (model C32.5S, MAAC Machinery Corporation, Carol Stream, Ill.). A male test mold having a 6.35 cm (2.50 inches) square base, a height of 1.27 cm (0.5 inches), and various radii and draft angles to its vertical sides was used to form the films (see FIGS. 1A to 1E). The following parameters were employed. The sheet temperature just before molding was measured using a laser sight equipped, portable non-contact (infrared) thermometer, commercially available under the trade designation "ScotchtrakInfrared Heat Tracer IR-16L3" from 3M Company, St. Paul, Minn.

Thermoforming Parameters for 5 Sided Box

| Parameter | Ex 1B | Ex 2B | Ex 3B | Ex 4B | Ex 5B | Ex. 6B | CE 1B | CE 2B |
|---|---|---|---|---|---|---|---|---|
| Upper Radiant Oven Master Output (%) | 55 | 55 | 55 | 55 | 55 | 55 | 55 | 55 |
| Lower Radiant Oven Master Output (%) | 55 | 55 | 55 | 55 | 55 | 55 | 55 | 55 |
| Upper Radiant Oven Compensation (%) | −99 | −99 | −99 | −99 | −99 | −99 | −99 | −99 |
| Lower Radiant Oven Compensation (%) | −25 | −25 | −25 | +25 | −25 | +25 | −25 | +25 |
| Bead Film Laminate Preheat Time (seconds) | 8 | 8 | 8 | 10 | 8 | 10 | 8 | 10 |
| Oven Door Position | Closed | Closed | Closed | Closed | Closed | Closed | Closed | Closed |
| Vacuum | Full, −30 in Hg | Full, −30 in Hg | Full, −30 in Hg | Full, −30 in Hg | Full, −30 in Hg | Full, −30 in Hg | Full, −30 in Hg | Full, −30 in Hg |
| Pressure Box Working Pressure (MPa) (PSI) | 58 | 58 | 58 | 58 | 58 | 58 | 58 | 58 |
| Top Platen Delay (seconds) | 0.1 | 0.1 | 0.1 | 0.1 | 0.1 | 0.1 | 0.1 | 0.1 |
| Measured Sheet Temperature Immediately Before Thermoforming (° C.) (° F.) | 106° C. (223° F.) | 105.5° C. (222° F.) | 106° C. (223° F.) | 153.9° C. (309° F.) | 105° C. (221° F.) | 161° C. (322° F.) | 105.5° C. (222° F.) | 155.5° C. (312° F.) |
| Mold Temperature (° C.) (° F.) | 68.3° C. (155° F.) | 68.3° C. (155° F.) | 68.3° C. (155° F.) | 68.3° C. (155° F.) | 68.3° C. (155° F.) | 121° C. (250° F.) | 68.3° C. (155° F.) | 68.3° C. (155° F.) |

Examples 1 to 5, CE 1 and CE 2 were tested for one or more of stain resistance, pencil hardness, and solvent resistance. Generally performance was less than desirable, as is seen in the tables below.

Examples 1A to 5A, CE 1A, and CE 2A demonstrated desirable stain resistance, coefficient of friction, solvent resistance, and pencil hardness characteristics, as seen in the tables below. SEM measurements of the thickness of the fluorinated layer between the beads were made for select samples with the following results: Example 1A: 60 micrometers, Example 2A: 63 micrometers, Example 4A: 73 micrometers.

Examples 1B to 6B demonstrated desirable stain resistance, coefficient of friction, solvent resistance, and pencil hardness characteristics as seen in the tables below.

Examples 1B to 6B thermoformed into the 5 sided box shape (see FIGS. 1A-1E) satisfactorily, keeping the smooth feeling, consistent visual appearance, and with no cracking observed. Comparative Example 1B was observed to thermoform unsatisfactorily, as the beads appeared to be sinking into the binder resin layer. Comparative Example 2B thermoformed unsatisfactorily based on cracking seen in the walls of the 5 sided box. Comparative Example 2B employed a high level of polyisocyanate (i.e. crosslinker) to polyol (i.e. total active hydrogen functionality), resulting in a construction too crosslinked to withstand elongation during thermoforming. Although the beads remained in place and the construction felt smooth on the top of the Comparative Example 2B thermoformed shape and maintained a matte appearance, cracking resulted at the base and partially up the side of the thermoformed shape. Comparative Example 1B, which employed the lowest level of polyisocyanate crosslinker, became substantially glossier after thermoforming. In addition, CE 1B no longer felt as smooth as the thermoformed examples of the invention. The glossier appearance and rougher texture are consistent with a film where beads were no longer coplanar and/or sank into the binder resin layer, owing to the low level of polyisocyanate crosslinker. Insufficient covalent bond formation between the binder resin layer and the microspheres, and insufficient crosslinking between polymer chains resulted when the level of polyisocyanate in the binder resin layer was low.

TABLE 1

Stain Resistance

| Ex. No. | Stain Resistance (delta b*) |
|---|---|
| 1 | 84 |
| 2 | 86 |
| CE 1 | 67.9 |
| CE 2 | Not measured |
| 1A | 28.15 |
| 2A | 14.57 |
| 3A | 14.18 |
| 4A | 31.05 |
| 5A | 13.82 |
| CE 1A | 21.7 |
| CE 2A | 20.85 |
| 1B | 16.08 |
| 2B | 11.86 |
| 3B | 8.47 |
| 4B | 16.38 |
| 5B | 17.7 |
| 6B | 32.95 |

TABLE 2

Coefficient of Friction (COF)

| Ex. No. | COF |
|---|---|
| 1A | 0.151 |
| 2A | 0.145 |
| 3A | 0.15 |
| 4A | 0.158 |
| 5A | 0.157 |
| 1B | 0.138 |
| 2B | 0.137 |
| 3B | 0.135 |
| 4B | 0.136 |
| 5B | 0.136 |
| 6B | 0.184 |

TABLE 3

Solvent Resistance

| Ex. No. | result |
|---|---|
| 1 | Fail |
| 2 | Fail |
| 3 | Fail |
| 4 | Fail |
| 5 | Fail |
| CE 1 | Fail |
| CE 2 | ND |
| 1A | Pass |
| 2A | Pass |
| 3A | Pass |
| 4A | Pass |
| 5A | Pass |
| CE 1A | Pass |
| CE 2A | ND |
| 1B | Pass |
| 2B | Pass |
| 3B | Pass |
| 4B | Pass |
| 5B | Pass |
| 6B | Fail |

TABLE 4

Pencil Hardness

| Ex. No. | Pencil Hardness |
|---|---|
| 1 | 3H |
| 2 | HB |
| 3 | 3H |
| 4 | HB |
| 5 | B |
| CE 1 | F |
| CE 2 | 3H |
| 1A | 9H * |
| 2A | 9H * |
| 3A | 9H * |
| 4A | 9H * |
| 5A | 9H * |
| CE 1A | 9H * |
| CE 2A | 9H * |
| 1B | 9H * |
| 2B | 9H * |
| 3B | 9H * |
| 4B | 9H * |
| 5B | 9H * |
| 6B | 10H |

* Not tested past 9H.

TABLE 5

Thermoforming Results

| Ex No. | Approximate percent equivalents of crosslinker to equivalents of total active hydrogen functionality | Thermoforming Result |
|---|---|---|
| 1B | 15.6 | Good |
| 2B | 13.4 | Good |
| 3B | 21.2 | Good |
| 4B | 12.1 | Good |
| 5B | 21.5 | Good |
| 6B | 10.0 | Good |
| CE 1B | 4.0 | Failed, glossy appearance and rougher surface |
| CE 2B | 31.0 | Failed, cracked. |

The invention claimed is:

1. An article comprising at least a first surface having:
   (a) a binder resin layer comprising a fluorine-containing polymer, wherein the binder resin layer has a first major surface opposite a second major surface; and
   (b) a plurality of microspheres partially embedded and adhered to the first major surface of the binder resin layer;
   wherein the fluorine-containing polymer is a partially fluorinated polymer derived from at least one fluorine containing monomer and two or more non-fluorinated monomers having at least one active hydrogen functional group, and further wherein at least one but not all of the active hydrogen functional groups are reacted with at least one curing agent having latent functionality and wherein the partially fluorinated polymer comprises a copolymer of the structure of Formula (I):

 (I)

wherein $R_f$ must be present as 30 mol % to 60 mol % of the polymer, and wherein $R_X$ must be present as 5 mol % to 20 mol % of the polymer, and further wherein the remaining mol % of the polymer are $R_L$, and $R_G$,
   (a) $R_f$ is selected from at least one of the following or combinations thereof:

—CF$_2$CF$_2$—,

—CFClCF$_2$—,

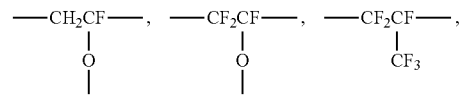

—CH$_2$CF$_2$— wherein $R_{f2}$ is fluoroalkyl having 1 to 8 carbon atoms;
   (b) $R_X$ is:

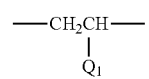

wherein $Q_1$ is

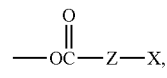

or

—O—Z—X wherein Z is optional, or when present, is selected from an alkylene, arylene, aralkylene or alkarylene, in which any are optionally substituted with N, O or S; and wherein X is OH, or SH, or NHR$_1$, where R$_1$ is H, alkyl or cycloalkyl having 1 to 22 carbon atoms;
   (c) $R_L$ is

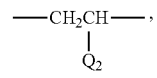

wherein $Q_2$ is,

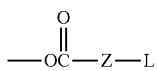

or,

wherein Z is optional, or when present, is selected from an alkylene, arylene, aralkylene, or alkarylene, in which any are optionally substituted with N, O or S and
L is

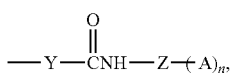

or

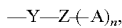

wherein Y is O, S, $NR_1$, wherein $R_1$ is H, or alkyl or cycloalkyl having 1 to 22 carbon atoms, and
A is

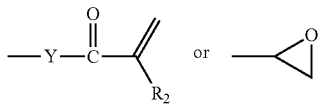

wherein n is 1 to 5 and $R_2$ is H or $CH_3$; and
(d) $R_G$ is

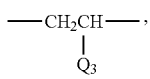

wherein $Q_3$ is

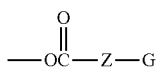

or

wherein Z is optional, or when present is selected from an alkylene, arylene, aralkylene, or alkarylene in which any are optionally substituted with N, O or S and wherein G is aryl, alkyl, aralkyl or alkaryl.

2. The article of claim 1 wherein $R_f$ must be present as 30 mol % to 60 mol % of the polymer; $R_X$ must be present as 5 mol % to 15 mol % of the polymer; and $R_L$, and $R_G$ comprises the remaining mol % of the polymer.

3. The article of claim 1 wherein the binder resin layer further comprises a condensation polymer or an acrylic polymer.

4. The article of claim 1 wherein the non-fluorinated monomer is a hydroxy-containing monomer.

5. The article of claim 1 wherein the partially fluorinated polymer has a number molecular weight of greater than or equal to 9000 g/mol.

6. The article of claim 1 wherein the binder resin layer further comprises a crosslinker.

7. The article of claim 6 wherein the crosslinker comprises polyisocyanate with latent functionality.

8. The article of claim 7 wherein the percent equivalents of crosslinker to equivalents of total active hydrogen functionality is between 7% and 25%.

9. The article of claim 7 wherein the percent equivalents of crosslinker to equivalents of total active hydrogen functionality is between 10% and 15%.

10. The article of claim 1 wherein the curing agent comprises polyisocyanate.

11. The article of claim 1 wherein the plurality of microspheres are selected from at least one of glass, polymers, glass ceramics, ceramics, metals and combinations thereof.

12. The article of claim 1 wherein at least about 60% of the surface of the article is covered with the plurality of microspheres.

13. The article of claim 1 further comprising a reinforcing layer disposed along the second major surface of the binder resin layer.

14. The article of claim 13 wherein the reinforcing layer comprises at least one of polyurethane resins, acrylic resins, polyester resins, epoxy resins, and combinations thereof.

15. The article of claim 14 wherein the polyurethane material is selected from polyurethane dispersions, two part urethanes coated from solvent, 100% solids two part urethanes, and combinations thereof.

16. The article of claim 1 wherein the fluorine content along the polymeric backbone of the fluorine-containing polymer is from about 25% to 72% by weight.

17. The article of claim 1 wherein the article is a thermoformable article.

18. A thermoset article derived from the articles of claim 1.

19. The thermoset article of claim 18 is a three-dimensional shaped thermoset article.

20. The thermoset article of claim 18 wherein curing is accomplished by actinic radiation curing.

21. The thermoset article of claim 18 wherein the thermoset article exhibits a stain resistance to yellow mustard after 72 hours at a temperature of 66° C. (150° F.) and relative humidity of 80%, as measured by a change in b*, as defined by the International Commission on Illumination (CIE) 1976 Color Space, of less than 50.

22. The thermoset article of claim 18 wherein the thermoset article exhibits a pencil hardness according to ASTM D 3363 of greater than or equal to 9H at 7.5 Newtons.

23. The thermoset article of claim 18 wherein the thermoset article is resistant to organic solvents.

24. The thermoset article of claim 18 wherein the thermoset article comprises a free-standing bead film and exhibits a kinetic coefficient of friction of less than 0.3, as measured using a peel tester.

* * * * *